(12) United States Patent
Amaitis et al.

(10) Patent No.: US 10,653,952 B2
(45) Date of Patent: May 19, 2020

(54) SYSTEM AND METHOD FOR WIRELESS GAMING WITH LOCATION DETERMINATION

(71) Applicant: INTERACTIVE GAMES LLC, New York, NY (US)

(72) Inventors: Lee Amaitis, Palm Beach Gardens, FL (US); Joseph M. Asher, Las Vegas, NV (US); Robert F. Bahrampour, New York, NY (US); Darrin M. Mylet, Tampa, FL (US); Alan B. Wilkins, Cary, NC (US); Howard W. Lutnick, New York, NY (US)

(73) Assignee: INTERACTIVE GAMES LLC, New York, NY (US)

( * ) Notice: Subject to any disclaimer, the term of this patent is extended or adjusted under 35 U.S.C. 154(b) by 0 days.

(21) Appl. No.: 16/516,342

(22) Filed: Jul. 19, 2019

(65) Prior Publication Data

US 2019/0336856 A1   Nov. 7, 2019

Related U.S. Application Data

(63) Continuation of application No. 15/250,500, filed on Aug. 29, 2016, now Pat. No. 10,391,397, which is a
(Continued)

(51) Int. Cl.
*A63F 13/332* (2014.01)
*G07F 17/32* (2006.01)
(Continued)

(52) U.S. Cl.
CPC .......... *A63F 13/332* (2014.09); *A63F 13/216* (2014.09); *A63F 13/35* (2014.09); *G07F 17/32* (2013.01); *G07F 17/3239* (2013.01)

(58) Field of Classification Search
CPC .............................. H04L 63/102; G01S 5/0252
See application file for complete search history.

(56) References Cited

U.S. PATENT DOCUMENTS

| 3,580,581 A | 5/1971 | Raven |
| 3,838,259 A | 9/1974 | Kortenhaus |

(Continued)

FOREIGN PATENT DOCUMENTS

| CN | 1346549 | 4/2002 |
| DE | 31 29 550 A1 | 4/1982 |

(Continued)

OTHER PUBLICATIONS

Defendants' Joint Unenforceability and Invalidity Contentions dated Mar. 21, 2017 (51 pages).
(Continued)

*Primary Examiner* — Reginald A Renwick

(57) ABSTRACT

In accordance with the teachings of the present invention, a system and method for wireless gaming with location determination are provided. In a particular embodiment of the present invention, the system includes a gaming server; a wireless network at least partially covering a property, the wireless network comprising a plurality of signal detection devices; and a gaming communication device operable to transmit and receive gaming information to and from the gaming server via the wireless network. A location of the gaming communication device on the property may be determined based upon a signal received by the plurality of signal detection devices from the gaming communication device. Based upon the location of the gaming communication device on the property, a predetermined functionality of the gaming communication device may be enabled.

20 Claims, 5 Drawing Sheets

Related U.S. Application Data continuation of application No. 13/612,301, filed on Sep. 12, 2012, now Pat. No. 9,430,901, which is a continuation of application No. 12/197,809, filed on Aug. 25, 2008, now Pat. No. 8,504,617, which is a continuation of application No. 11/201,812, filed on Aug. 10, 2005, now abandoned, and a continuation of application No. 11/063,311, filed on Feb. 21, 2005, now Pat. No. 8,616,967, and a continuation-in-part of application No. 10/835,995, filed on Apr. 29, 2004, now Pat. No. 8,092,303.

(60) Provisional application No. 60/697,861, filed on Jul. 8, 2005, provisional application No. 60/549,187, filed on Mar. 1, 2004, provisional application No. 60/547,507, filed on Feb. 25, 2004.

(51) Int. Cl.
*A63F 13/216* (2014.01)
*A63F 13/35* (2014.01)

(56) References Cited

U.S. PATENT DOCUMENTS

| | | |
|---|---|---|
| 3,876,208 A | 4/1975 | Wachtler et al. |
| 3,929,338 A | 12/1975 | Busch |
| 4,101,129 A | 7/1978 | Cox |
| 4,120,294 A | 10/1978 | Wolfe |
| 4,157,829 A | 6/1979 | Goldman et al. |
| 4,206,920 A | 6/1980 | Weatherford et al. |
| 4,216,965 A | 8/1980 | Morrison et al. |
| 4,238,127 A | 12/1980 | Lucero et al. |
| 4,240,635 A | 12/1980 | Brown |
| 4,266,214 A | 5/1981 | Peters, Jr. |
| 4,335,809 A | 6/1982 | Wain |
| 4,448,419 A | 5/1984 | Telnaes |
| 4,467,424 A | 8/1984 | Hedges et al. |
| 4,492,379 A | 1/1985 | Okada |
| 4,527,798 A | 7/1985 | Siekierski et al. |
| 4,572,509 A | 2/1986 | Stirick |
| 4,573,681 A | 3/1986 | Okada |
| 4,614,342 A | 9/1986 | Takashima |
| 4,624,459 A | 11/1986 | Kaufman |
| 4,636,951 A | 1/1987 | Harlick |
| 4,648,600 A | 3/1987 | Oliiges |
| 4,652,998 A | 3/1987 | Koza et al. |
| 4,692,863 A | 9/1987 | Moosz |
| 4,760,527 A | 7/1988 | Sidley |
| 4,805,907 A | 2/1989 | Hagiwara |
| 4,810,868 A | 3/1989 | Drexler |
| 4,817,951 A | 4/1989 | Crouch et al. |
| 4,838,552 A | 6/1989 | Hagiwara |
| 4,853,884 A | 8/1989 | Brown et al. |
| 4,856,787 A | 8/1989 | Itkis |
| 4,858,932 A | 8/1989 | Keane |
| 4,880,237 A | 11/1989 | Kishishita |
| 4,882,473 A | 11/1989 | Bergeron et al. |
| 4,909,516 A | 3/1990 | Kolinsky |
| 4,926,327 A | 5/1990 | Sidley |
| 4,959,783 A | 9/1990 | Scott et al. |
| 4,964,638 A | 10/1990 | Ishida |
| 5,001,632 A | 3/1991 | Hall-Tipping |
| 5,007,087 A | 4/1991 | Bernstein et al. |
| 5,024,441 A | 6/1991 | Rosseau |
| 5,048,833 A | 9/1991 | Lamle |
| 5,050,881 A | 9/1991 | Nagao |
| 5,055,662 A | 10/1991 | Hasegawa |
| 5,056,141 A | 10/1991 | Dyke |
| 5,074,559 A | 12/1991 | Okada |
| 5,083,785 A | 1/1992 | Okada |
| 5,096,195 A | 3/1992 | Gimmon |
| 5,096,202 A | 3/1992 | Hesland |
| 5,102,134 A | 4/1992 | Smyth |
| 5,151,684 A | 9/1992 | Johnsen |
| 5,192,076 A | 3/1993 | Komori |
| 5,229,764 A | 7/1993 | Matchett et al. |
| 5,242,163 A | 9/1993 | Fulton |
| 5,251,165 A | 10/1993 | James, III |
| 5,251,898 A | 10/1993 | Dickenson et al. |
| 5,263,716 A | 11/1993 | Smyth |
| 5,265,874 A | 11/1993 | Dickinson et al. |
| 5,280,426 A | 1/1994 | Edmonds |
| 5,280,909 A | 1/1994 | Tracy |
| 5,298,476 A | 3/1994 | Hotta et al. |
| 5,324,035 A | 6/1994 | Morris et al. |
| 5,326,104 A | 7/1994 | Pease et al. |
| 5,344,199 A | 9/1994 | Carstens et al. |
| 5,351,970 A | 10/1994 | Fioretti |
| 5,359,183 A | 10/1994 | Skodlar |
| 5,370,306 A | 12/1994 | Schulze et al. |
| 5,380,007 A | 1/1995 | Travis et al. |
| 5,380,008 A | 1/1995 | Mathis et al. |
| 5,393,061 A | 2/1995 | Manship et al. |
| 5,398,932 A | 3/1995 | Eberhardt et al. |
| 5,415,416 A | 5/1995 | Scagnelli et al. |
| 5,421,576 A | 6/1995 | Yamazaki et al. |
| 5,429,361 A | 7/1995 | Raven et al. |
| 5,471,044 A | 11/1995 | Hotta et al. |
| 5,476,259 A | 12/1995 | Weingardt |
| 5,505,449 A | 4/1996 | Eberhardt et al. |
| 5,507,485 A | 4/1996 | Fisher |
| 5,511,784 A | 4/1996 | Furry et al. |
| 5,524,888 A | 6/1996 | Heidel |
| 5,534,685 A | 7/1996 | Takemoto et al. |
| 5,551,692 A | 9/1996 | Pettit et al. |
| 5,569,083 A | 10/1996 | Fioretti |
| 5,569,084 A | 10/1996 | Nicastro et al. |
| 5,580,309 A | 12/1996 | Piechowiak et al. |
| 5,586,937 A | 12/1996 | Menashe |
| 5,588,913 A | 12/1996 | Hecht |
| 5,599,231 A | 2/1997 | Hibino et al. |
| 5,613,912 A | 3/1997 | Slater |
| 5,618,045 A | 4/1997 | Kagan et al. |
| 5,618,232 A | 4/1997 | Martin |
| 5,645,277 A | 7/1997 | Cheng |
| 5,653,634 A | 8/1997 | Hodges |
| 5,654,746 A | 8/1997 | McMulan, Jr. et al. |
| 5,655,961 A | 8/1997 | Acres et al. |
| 5,675,828 A | 10/1997 | Stoel et al. |
| 5,697,844 A | 12/1997 | Von Kohorn |
| 5,702,302 A | 12/1997 | Gauselman |
| 5,707,286 A | 1/1998 | Carlson |
| 5,738,583 A | 4/1998 | Comas et al. |
| 5,745,102 A | 4/1998 | Bloch et al. |
| 5,762,552 A | 6/1998 | Vuong et al. |
| 5,764,789 A | 6/1998 | Pare, Jr. et al. |
| 5,766,076 A | 6/1998 | Pease et al. |
| 5,768,382 A | 6/1998 | Schneier et al. |
| 5,772,508 A | 6/1998 | Sugita et al. |
| 5,779,549 A | 7/1998 | Walker |
| 5,785,595 A | 7/1998 | Gauselman |
| 5,787,156 A | 7/1998 | Katz |
| 5,806,849 A | 9/1998 | Rutkowski |
| 5,816,918 A | 10/1998 | Kelly et al. |
| 5,816,920 A | 10/1998 | Hanai |
| 5,851,148 A | 10/1998 | Brune et al. |
| 5,833,536 A | 11/1998 | Davids et al. |
| 5,835,722 A | 11/1998 | Bradshaw et al. |
| 5,836,817 A | 11/1998 | Acres et al. |
| 5,857,911 A | 1/1999 | Fioretti |
| 5,871,398 A | 2/1999 | Schneier et al. |
| 5,878,211 A | 3/1999 | Delagrange |
| 5,881,366 A | 3/1999 | Bodenmann et al. |
| 5,889,474 A | 3/1999 | LaDue |
| 5,902,983 A | 5/1999 | Crevelt et al. |
| 5,904,619 A | 5/1999 | Scagnelli et al. |
| 5,904,620 A | 5/1999 | Kujawa |
| 5,907,282 A | 5/1999 | Tuorto et al. |
| 5,910,047 A | 6/1999 | Scagnelli et al. |
| 5,920,640 A | 7/1999 | Salatino et al. |
| 5,921,865 A | 7/1999 | Scagnelli |
| 5,931,764 A | 8/1999 | Freeman et al. |
| 5,935,005 A | 8/1999 | Tsuda et al. |

(56) References Cited

U.S. PATENT DOCUMENTS

| | | |
|---|---|---|
| 5,951,397 A | 9/1999 | Dickinson |
| 5,954,583 A | 9/1999 | Green |
| 5,955,961 A | 9/1999 | Wallerstein |
| 5,959,596 A | 9/1999 | McCarten et al. |
| 5,970,143 A | 10/1999 | Schneier et al. |
| 5,977,957 A | 11/1999 | Miller et al. |
| 5,987,611 A | 11/1999 | Freund |
| 5,991,431 A | 11/1999 | Borza et al. |
| 5,995,630 A | 11/1999 | Borza et al. |
| 5,999,808 A | 12/1999 | LaDue |
| 6,001,015 A | 12/1999 | Nishiumi et al. |
| 6,001,016 A | 12/1999 | Walker et al. |
| 6,003,013 A | 12/1999 | Boushy et al. |
| 6,012,636 A | 1/2000 | Smith |
| 6,012,982 A | 1/2000 | Piechowiak et al. |
| 6,019,284 A | 2/2000 | Freeman et al. |
| 6,022,274 A | 2/2000 | Takeda et al. |
| 6,027,115 A | 2/2000 | Griswold et al. |
| 6,044,062 A | 3/2000 | Brownrigg et al. |
| 6,048,269 A | 4/2000 | Burns et al. |
| 6,050,622 A | 4/2000 | Gustafson |
| 6,065,056 A | 5/2000 | Bradshaw et al. |
| 6,080,061 A | 6/2000 | Watanabe et al. |
| 6,098,985 A | 8/2000 | Moody |
| 6,099,408 A | 8/2000 | Schneier et al. |
| 6,100,804 A | 8/2000 | Brady et al. |
| 6,104,295 A | 8/2000 | Gaisser et al. |
| 6,104,815 A | 8/2000 | Alcorn |
| 6,117,011 A | 9/2000 | Lvov |
| 6,135,884 A | 10/2000 | Hedrick et al. |
| 6,139,431 A | 10/2000 | Walker et al. |
| 6,146,270 A | 11/2000 | Huard et al. |
| 6,148,094 A | 11/2000 | Kinsella |
| 6,177,905 B1 | 1/2001 | Welch |
| 6,178,255 B1 | 1/2001 | Scott et al. |
| 6,178,510 B1 | 1/2001 | O'Connor et al. |
| 6,183,366 B1 | 2/2001 | Goldberg et al. |
| 6,193,153 B1 | 2/2001 | Lambert |
| 6,196,920 B1 | 3/2001 | Spaur et al. |
| 6,210,274 B1 | 4/2001 | Carlson |
| 6,219,439 B1 | 4/2001 | Burger |
| 6,233,448 B1 | 5/2001 | Alperovich et al. |
| 6,248,017 B1 | 6/2001 | Roach |
| 6,251,014 B1 | 6/2001 | Stockdale et al. |
| 6,251,017 B1 | 6/2001 | Leason et al. |
| 6,264,560 B1 | 7/2001 | Goldberg et al. |
| 6,265,973 B1 | 7/2001 | Brammall et al. |
| 6,272,223 B1 | 8/2001 | Carlson |
| 6,277,026 B1 | 8/2001 | Archer |
| 6,277,029 B1 | 8/2001 | Hanley |
| 6,280,325 B1 | 8/2001 | Fisk |
| 6,287,202 B1 | 9/2001 | Pascal et al. |
| 6,290,601 B1 | 9/2001 | Yamazaki et al. |
| RE37,414 E | 10/2001 | Harlick |
| 6,309,307 B1 | 10/2001 | Krause et al. |
| 6,320,495 B1 | 11/2001 | Sporgis |
| 6,325,285 B1 | 12/2001 | Baratelli |
| 6,325,292 B1 | 12/2001 | Sehr |
| 6,331,148 B1 | 12/2001 | Krause et al. |
| 6,359,661 B1 | 3/2002 | Nickum |
| 6,386,976 B1 | 5/2002 | Yamazaki et al. |
| 6,388,612 B1 | 5/2002 | Neher |
| 6,409,602 B1 | 6/2002 | Wiltshire et al. |
| 6,424,029 B1 | 7/2002 | Giesler |
| 6,425,828 B2 | 7/2002 | Walker et al. |
| 6,428,413 B1 | 8/2002 | Carlson |
| 6,441,752 B1 | 8/2002 | Fomukong |
| RE37,885 E | 10/2002 | Acres et al. |
| 6,468,155 B1 | 10/2002 | Zucker |
| 6,507,279 B2 | 1/2003 | Loof |
| 6,508,709 B1 | 1/2003 | Karmarkar |
| 6,508,710 B1 | 1/2003 | Paravia |
| 6,509,217 B1 | 1/2003 | Reddy |
| 6,520,853 B2 | 2/2003 | Suzuki |
| 6,524,189 B1 | 2/2003 | Rautila |
| 6,527,641 B1 | 3/2003 | Sinclair et al. |
| 6,542,750 B2 | 4/2003 | Hendrey et al. |
| 6,554,705 B1 | 4/2003 | Cumbers |
| 6,554,707 B1 | 4/2003 | Sinclair |
| 6,556,819 B2 | 4/2003 | Irvin |
| 6,575,834 B1 | 6/2003 | Lindo |
| 6,577,733 B1 | 6/2003 | Charrin |
| 6,582,302 B2 | 6/2003 | Romero |
| 6,585,597 B2 | 7/2003 | Finn |
| 6,604,980 B1 | 8/2003 | Jurmain |
| 6,612,928 B1 | 9/2003 | Bradford et al. |
| 6,614,350 B1 | 9/2003 | Lunsford |
| 6,618,706 B1 | 9/2003 | Rive et al. |
| 6,622,157 B1 | 9/2003 | Heddaya et al. |
| 6,628,939 B2 | 9/2003 | Paulsen |
| 6,631,849 B2 | 10/2003 | Blossom |
| 6,634,942 B2 | 10/2003 | Walker |
| 6,645,077 B2 | 11/2003 | Rowe |
| 6,652,378 B2 | 11/2003 | Cannon et al. |
| 6,676,522 B2 | 1/2004 | Rowe et al. |
| 6,680,675 B1 | 1/2004 | Suzuki |
| 6,682,421 B1 | 1/2004 | Rowe et al. |
| 6,691,032 B1 | 2/2004 | Irish et al. |
| 6,709,333 B1 | 3/2004 | Bradford et al. |
| 6,719,631 B1 | 4/2004 | Tulley et al. |
| 6,721,542 B1 | 4/2004 | Anttila et al. |
| 6,729,956 B2 | 5/2004 | Wolf et al. |
| 6,743,098 B2 | 6/2004 | Urie et al. |
| 6,745,011 B1 | 6/2004 | Hendrickson |
| 6,749,505 B1 | 6/2004 | Kunzle |
| 6,754,210 B1 | 6/2004 | Ofek |
| 6,755,742 B1 | 6/2004 | Hartman |
| 6,756,882 B2 | 6/2004 | Benes |
| 6,761,638 B1 | 7/2004 | Narita |
| 6,773,350 B2 | 8/2004 | Yoshimi et al. |
| 6,778,820 B2 | 8/2004 | Tendler |
| 6,793,580 B2 | 9/2004 | Sinclair |
| 6,800,029 B2 | 10/2004 | Rowe et al. |
| 6,800,031 B2 | 10/2004 | Di Cesare |
| 6,801,934 B1 | 10/2004 | Eranko |
| 6,802,772 B1 | 10/2004 | Kunzle |
| 6,806,889 B1 | 10/2004 | Malaure |
| 6,812,824 B1 | 11/2004 | Goldinger et al. |
| 6,834,195 B2 | 12/2004 | Brandenberq et al. |
| 6,837,789 B2 | 1/2005 | Garahi et al. |
| 6,839,560 B1 | 1/2005 | Bahl et al. |
| 6,843,412 B1 | 1/2005 | Sanford |
| 6,843,725 B2 | 1/2005 | Nelson |
| 6,846,238 B2 | 1/2005 | Wells |
| 6,857,959 B1 | 2/2005 | Nguyen |
| 6,863,610 B2 | 3/2005 | Vancraeynest |
| 6,868,396 B2 | 3/2005 | Smith et al. |
| 6,884,162 B2 | 4/2005 | Raverdy |
| 6,884,166 B2 | 4/2005 | Leen et al. |
| 6,887,151 B2 | 5/2005 | Leen et al. |
| 6,887,159 B2 | 5/2005 | Leen et al. |
| 6,892,218 B2 | 5/2005 | Heddaya et al. |
| 6,892,938 B2 | 5/2005 | Solomon |
| 6,896,618 B2 | 5/2005 | Benoy et al. |
| 6,898,299 B1 | 5/2005 | Brooks |
| 6,899,628 B2 | 5/2005 | Leen et al. |
| 6,904,520 B1 | 6/2005 | Rosset |
| 6,908,387 B2 | 6/2005 | Hedrick et al. |
| 6,908,391 B2 | 6/2005 | Gatto et al. |
| 6,923,724 B2 | 8/2005 | Williams |
| 6,935,952 B2 | 8/2005 | Walker et al. |
| 6,935,958 B2 | 8/2005 | Nelson |
| 6,942,574 B1 | 9/2005 | Lemay et al. |
| 6,945,870 B2 | 9/2005 | Gatto et al. |
| RE38,812 E | 10/2005 | Acres et al. |
| 6,966,832 B2 | 11/2005 | Leen et al. |
| 6,979,264 B2 | 12/2005 | Chatigny et al. |
| 6,979,267 B2 | 12/2005 | Leen et al. |
| 6,984,175 B2 | 1/2006 | Nguyen et al. |
| 6,986,055 B2 | 1/2006 | Carlson |
| 6,997,810 B2 | 2/2006 | Cole |
| 7,021,623 B2 | 4/2006 | Leen et al. |
| 7,022,017 B1 | 4/2006 | Halbritter et al. |
| 7,027,820 B2 | 4/2006 | Spratt |

(56) References Cited

U.S. PATENT DOCUMENTS

| | | |
|---|---|---|
| 7,029,394 B2 | 4/2006 | Leen et al. |
| 7,033,276 B2 | 4/2006 | Walker et al. |
| 7,034,683 B2 | 4/2006 | Ghazarian |
| 7,035,653 B2 | 4/2006 | Simon et al. |
| 7,040,987 B2 | 5/2006 | Walker et al. |
| 7,042,360 B2 | 5/2006 | Light et al. |
| 7,042,391 B2 | 5/2006 | Meunier et al. |
| 7,043,641 B1 | 5/2006 | Martinek et al. |
| 7,047,197 B1 | 5/2006 | Bennett |
| 7,056,217 B1 | 6/2006 | Pelkey et al. |
| 7,081,815 B2 | 7/2006 | Runyon et al. |
| 7,097,562 B2 | 8/2006 | Gagner |
| 7,102,507 B1 | 9/2006 | Lauren |
| 7,102,509 B1 | 9/2006 | Anders et al. |
| 7,124,947 B2 | 10/2006 | Storch |
| 7,125,334 B2 | 10/2006 | Yamazaki et al. |
| 7,128,482 B2 | 10/2006 | Meyerhofer et al. |
| 7,144,011 B2 | 12/2006 | Asher et al. |
| 7,147,558 B2 | 12/2006 | Giobbi |
| 7,158,798 B2 | 1/2007 | Lee et al. |
| 7,168,626 B2 | 1/2007 | Lerch et al. |
| 7,185,360 B1 | 2/2007 | Anton et al. |
| 7,194,273 B2 | 3/2007 | Vaudreuil |
| 7,207,885 B2 | 4/2007 | Longman |
| 7,228,651 B1 | 6/2007 | Saari |
| 7,229,354 B2 | 6/2007 | McNutt et al. |
| 7,229,385 B2 | 6/2007 | Freeman et al. |
| 7,233,922 B2 | 6/2007 | Asher et al. |
| 7,248,852 B2 | 7/2007 | Cabrera et al. |
| 7,270,605 B2 | 9/2007 | Russell et al. |
| 7,284,708 B2 | 10/2007 | Martin |
| 7,288,025 B1 | 10/2007 | Cumbers |
| 7,288,028 B2 | 10/2007 | Rodriquez et al. |
| 7,290,264 B1 | 10/2007 | Powers et al. |
| 7,297,062 B2 | 11/2007 | Gatto et al. |
| 7,306,514 B2 | 12/2007 | Amaitis et al. |
| 7,311,605 B2 | 12/2007 | Moser |
| 7,311,606 B2 | 12/2007 | Amaitis et al. |
| 7,311,608 B1 | 12/2007 | Danieli |
| 7,316,619 B2 | 1/2008 | Nelson |
| 7,341,517 B2 | 3/2008 | Asher et al. |
| 7,357,717 B1 | 4/2008 | Cumbers |
| 7,367,049 B1 | 4/2008 | Robinson |
| 7,394,405 B2 | 7/2008 | Godden |
| 7,413,513 B2 | 8/2008 | Nguyen et al. |
| 7,429,215 B2 | 9/2008 | Rozkin |
| 7,431,650 B2 | 10/2008 | Kessman |
| 7,435,179 B1 | 10/2008 | Ford |
| 7,437,147 B1 | 10/2008 | Luciano, Jr. |
| 7,442,124 B2 | 10/2008 | Asher et al. |
| 7,452,273 B2 | 11/2008 | Amaitis et al. |
| 7,452,274 B2 | 11/2008 | Amaitis et al. |
| 7,458,891 B2 | 12/2008 | Asher et al. |
| 7,458,894 B2 | 12/2008 | Danieli |
| 7,470,191 B2 | 12/2008 | Xidos |
| 7,479,065 B1 | 1/2009 | McAllister et al. |
| 7,506,172 B2 | 3/2009 | Bhakta |
| 7,510,474 B2 | 3/2009 | Carter |
| 7,534,169 B2 | 5/2009 | Amaitis et al. |
| 7,546,946 B2 | 6/2009 | Hefner et al. |
| 7,549,576 B2 | 6/2009 | Alderucci et al. |
| 7,549,756 B2 | 6/2009 | Willis et al. |
| 7,562,034 B2 | 7/2009 | Asher et al. |
| 7,566,270 B2 | 7/2009 | Amaitis et al. |
| 7,577,847 B2 | 8/2009 | Nguyen |
| 7,637,810 B2 | 12/2009 | Amaitis et al. |
| 7,665,668 B2 | 2/2010 | Phillips |
| 7,686,687 B2 | 3/2010 | Cannon et al. |
| 7,689,459 B2 | 3/2010 | Capurso et al. |
| 7,736,221 B2 | 6/2010 | Black et al. |
| 7,742,972 B2 | 6/2010 | Lange et al. |
| 7,744,002 B2 | 6/2010 | Jones et al. |
| 7,819,749 B1 | 10/2010 | Fish et al. |
| 7,828,652 B2 | 11/2010 | Nguyen et al. |
| 7,828,654 B2 | 11/2010 | Carter, Sr. |
| 7,828,661 B1 | 11/2010 | Fish et al. |
| 7,867,083 B2 | 1/2011 | Wells et al. |
| 7,946,917 B2 | 5/2011 | Kaminkow et al. |
| 7,967,682 B2 | 6/2011 | Huizinga |
| 8,016,667 B2 | 9/2011 | Benbrahim et al. |
| 8,047,914 B2 | 11/2011 | Morrow |
| 8,123,616 B2 | 2/2012 | Wells et al. |
| 8,142,283 B2 | 3/2012 | Lutnick |
| 8,162,756 B2 | 4/2012 | Amaitis et al. |
| 8,221,225 B2 | 7/2012 | Laut |
| 8,267,789 B2 | 9/2012 | Nelson |
| 8,285,484 B1 | 10/2012 | Lau |
| 8,287,380 B2 | 10/2012 | Nguyen |
| 8,292,741 B2 | 10/2012 | Burman et al. |
| 8,298,078 B2 | 10/2012 | Sutton et al. |
| 8,306,830 B1 | 11/2012 | Renuart |
| 8,393,948 B2 | 3/2013 | Allen |
| 8,425,314 B2 | 4/2013 | Benbrahim |
| 8,504,617 B2 | 8/2013 | Amaitis et al. |
| 8,506,400 B2 | 8/2013 | Amaitis et al. |
| 8,510,567 B2 | 8/2013 | Alderucci et al. |
| 8,613,658 B2 | 12/2013 | Amaitis et al. |
| 8,645,709 B2 | 2/2014 | Alderucci et al. |
| 8,708,805 B2 | 4/2014 | Amaitis et al. |
| 8,764,566 B2 | 7/2014 | Miltenberger |
| 8,784,197 B2 | 7/2014 | Alderucci et al. |
| 8,956,231 B2 | 2/2015 | Amaitis et al. |
| 8,968,077 B2 | 3/2015 | Weber et al. |
| 8,974,302 B2 | 3/2015 | Amaitis et al. |
| 9,280,648 B2 | 3/2016 | Alderucci |
| 9,306,952 B2 | 4/2016 | Burman et al. |
| 9,355,518 B2 | 5/2016 | Amaitis et al. |
| 9,363,251 B2 | 6/2016 | Morikuni |
| 9,411,944 B2 | 8/2016 | Alderucci et al. |
| 9,430,901 B2 | 8/2016 | Amaitis et al. |
| 9,430,909 B2 | 8/2016 | Shore |
| 2001/0018663 A1 | 8/2001 | Dusell et al. |
| 2001/0026240 A1 | 10/2001 | Neher |
| 2001/0026610 A1 | 10/2001 | Katz et al. |
| 2001/0026632 A1 | 10/2001 | Tamai |
| 2001/0027130 A1 | 10/2001 | Namba et al. |
| 2001/0028308 A1 | 10/2001 | De La Huerga |
| 2001/0031663 A1 | 10/2001 | Johnson |
| 2001/0034237 A1 | 10/2001 | Garahi |
| 2001/0034268 A1 | 10/2001 | Thomas et al. |
| 2001/0036858 A1 | 11/2001 | McNutt et al. |
| 2001/0049275 A1 | 12/2001 | Pierry et al. |
| 2001/0055991 A1 | 12/2001 | Hightower |
| 2002/0002075 A1 | 1/2002 | Rowe |
| 2002/0013827 A1 | 1/2002 | Edstrom et al. |
| 2002/0034978 A1 | 3/2002 | Legge et al. |
| 2002/0037767 A1 | 3/2002 | Ebin |
| 2002/0049909 A1 | 4/2002 | Jackson et al. |
| 2002/0052231 A1 | 5/2002 | Fioretti |
| 2002/0065097 A1 | 5/2002 | Brockenbrough |
| 2002/0068631 A1 | 6/2002 | Raverdy |
| 2002/0073021 A1 | 6/2002 | Ginsberg et al. |
| 2002/0074725 A1 | 6/2002 | Stern |
| 2002/0086732 A1 | 7/2002 | Kirmse et al. |
| 2002/0087505 A1 | 7/2002 | Smith |
| 2002/0095586 A1 | 7/2002 | Doyle et al. |
| 2002/0111210 A1 | 8/2002 | Luciano |
| 2002/0111213 A1 | 8/2002 | McEntee et al. |
| 2002/0119817 A1 | 8/2002 | Behm |
| 2002/0123377 A1 | 9/2002 | Shulman |
| 2002/0124182 A1 | 9/2002 | Basco |
| 2002/0125886 A1 | 9/2002 | Bates et al. |
| 2002/0128057 A1 | 9/2002 | Walker et al. |
| 2002/0132663 A1 | 9/2002 | Cumbers |
| 2002/0138461 A1 | 9/2002 | Sinclair |
| 2002/0142839 A1 | 10/2002 | Wolinsky |
| 2002/0142844 A1 | 10/2002 | Kerr |
| 2002/0142846 A1 | 10/2002 | Paulsen |
| 2002/0143960 A1 | 10/2002 | Goren |
| 2002/0143991 A1 | 10/2002 | Chow et al. |
| 2002/0147047 A1 | 10/2002 | Letovsky |
| 2002/0147049 A1 | 10/2002 | Carter |
| 2002/0151344 A1 | 10/2002 | Tanskanen |
| 2002/0155884 A1 | 10/2002 | Updike |

(56) References Cited

U.S. PATENT DOCUMENTS

| | | |
|---|---|---|
| 2002/0157090 A1 | 10/2002 | Anton, Jr. |
| 2002/0160834 A1 | 10/2002 | Urie et al. |
| 2002/0160838 A1 | 10/2002 | Kim |
| 2002/0165020 A1 | 11/2002 | Koyama |
| 2002/0174336 A1 | 11/2002 | Sakakibara et al. |
| 2002/0183105 A1 | 12/2002 | Cannon et al. |
| 2002/0184653 A1 | 12/2002 | Pierce et al. |
| 2002/0191017 A1 | 12/2002 | Sinclair |
| 2002/0198044 A1 | 12/2002 | Walker |
| 2002/0198051 A1 | 12/2002 | Lobel et al. |
| 2003/0003988 A1 | 1/2003 | Walker et al. |
| 2003/0003997 A1 | 1/2003 | Vuong et al. |
| 2003/0006931 A1 | 1/2003 | Mages |
| 2003/0008662 A1 | 1/2003 | Stern et al. |
| 2003/0009603 A1 | 1/2003 | Ruths et al. |
| 2003/0013438 A1 | 1/2003 | Darby |
| 2003/0013513 A1 | 1/2003 | Rowe |
| 2003/0014639 A1 | 1/2003 | Jackson et al. |
| 2003/0017871 A1 | 1/2003 | Urie et al. |
| 2003/0027631 A1 | 2/2003 | Hedrick et al. |
| 2003/0028567 A1 | 2/2003 | Carlson |
| 2003/0031321 A1 | 2/2003 | Mages |
| 2003/0032407 A1 | 2/2003 | Mages |
| 2003/0032434 A1 | 2/2003 | Willner et al. |
| 2003/0032474 A1 | 2/2003 | Kaminkow et al. |
| 2003/0036425 A1 | 2/2003 | Kaminkow et al. |
| 2003/0036428 A1 | 2/2003 | Aasland |
| 2003/0038805 A1 | 2/2003 | Wong et al. |
| 2003/0040324 A1 | 2/2003 | Eldering et al. |
| 2003/0045353 A1 | 3/2003 | Paulsen et al. |
| 2003/0045354 A1 | 3/2003 | Globbi |
| 2003/0045358 A1 | 3/2003 | Leen et al. |
| 2003/0050115 A1 | 3/2003 | Leen et al. |
| 2003/0054878 A1 | 3/2003 | Benoy et al. |
| 2003/0060286 A1 | 3/2003 | Walker |
| 2003/0064712 A1 | 4/2003 | Gaston |
| 2003/0064798 A1 | 4/2003 | Grauzer et al. |
| 2003/0064805 A1 | 4/2003 | Wells |
| 2003/0064807 A1 | 4/2003 | Walker et al. |
| 2003/0065805 A1 | 4/2003 | Barnes, Jr. |
| 2003/0069071 A1 | 4/2003 | Britt et al. |
| 2003/0069940 A1 | 4/2003 | Kavacheri et al. |
| 2003/0078101 A1 | 4/2003 | Schneider et al. |
| 2003/0087652 A1 | 5/2003 | Simon et al. |
| 2003/0087701 A1 | 5/2003 | Paravia et al. |
| 2003/0104851 A1 | 6/2003 | Merari |
| 2003/0104865 A1 | 6/2003 | Itkis et al. |
| 2003/0109306 A1 | 6/2003 | Karmarkar |
| 2003/0109310 A1 | 6/2003 | Heaton et al. |
| 2003/0114218 A1 | 6/2003 | McClintic |
| 2003/0125973 A1 | 7/2003 | Mathews |
| 2003/0130032 A1 | 7/2003 | Martinek et al. |
| 2003/0139190 A1 | 7/2003 | Steelberg |
| 2003/0140131 A1 | 7/2003 | Chandrashekhar |
| 2003/0144047 A1 | 7/2003 | Sprogis |
| 2003/0148809 A1 | 8/2003 | Nelson |
| 2003/0148812 A1 | 8/2003 | Paulsen |
| 2003/0157976 A1 | 8/2003 | Simon |
| 2003/0162580 A1 | 8/2003 | Cousineau |
| 2003/0162593 A1 | 8/2003 | Griswold et al. |
| 2003/0162594 A1 | 8/2003 | Rowe |
| 2003/0165293 A1 | 8/2003 | Grisworld et al. |
| 2003/0173408 A1 | 9/2003 | Mosher et al. |
| 2003/0176162 A1 | 9/2003 | Planki |
| 2003/0176218 A1 | 9/2003 | Lemay |
| 2003/0177187 A1 | 9/2003 | Levine et al. |
| 2003/0177347 A1 | 9/2003 | Schneier et al. |
| 2003/0190944 A1 | 10/2003 | Manfredi et al. |
| 2003/0195037 A1 | 10/2003 | Voung et al. |
| 2003/0195043 A1 | 10/2003 | Shinners et al. |
| 2003/0195841 A1 | 10/2003 | Ginsberg et al. |
| 2003/0199313 A1 | 10/2003 | Gonen |
| 2003/0208684 A1 | 11/2003 | Camacho et al. |
| 2003/0212996 A1 | 11/2003 | Wolzien |
| 2003/0224855 A1 | 12/2003 | Cunningham |
| 2003/0228895 A1 | 12/2003 | Edelson |
| 2003/0228898 A1 | 12/2003 | Rowe |
| 2003/0228901 A1 | 12/2003 | Walker et al. |
| 2003/0228907 A1 | 12/2003 | Gatto et al. |
| 2003/0228910 A1 | 12/2003 | Jawaharla et al. |
| 2003/0233650 A1 | 12/2003 | Zaner |
| 2003/0236120 A1 | 12/2003 | Reece |
| 2004/0002355 A1 | 1/2004 | Spencer |
| 2004/0002383 A1 | 1/2004 | Lundy |
| 2004/0002386 A1 | 1/2004 | Wolfe et al. |
| 2004/0002843 A1 | 1/2004 | Robarts |
| 2004/0005919 A1 | 1/2004 | Walker |
| 2004/0009812 A1 | 1/2004 | Scott et al. |
| 2004/0014522 A1 | 1/2004 | Walker et al. |
| 2004/0029635 A1 | 2/2004 | Giobbi |
| 2004/0029638 A1 | 2/2004 | Hytchenson |
| 2004/0034775 A1 | 2/2004 | Desjardins et al. |
| 2004/0038734 A1 | 2/2004 | Adams |
| 2004/0044774 A1 | 3/2004 | Mangalik et al. |
| 2004/0048613 A1 | 3/2004 | Sayers |
| 2004/0053692 A1 | 3/2004 | Chatingny et al. |
| 2004/0061646 A1 | 4/2004 | Andrews et al. |
| 2004/0063497 A1 | 4/2004 | Gould |
| 2004/0067760 A1 | 4/2004 | Menjo et al. |
| 2004/0068441 A1 | 4/2004 | Werbitt |
| 2004/0068532 A1 | 4/2004 | Dewing |
| 2004/0082383 A1 | 4/2004 | Muncaster |
| 2004/0083394 A1 | 4/2004 | Brebner et al. |
| 2004/0669296 | 4/2004 | Atherton |
| 2004/0092306 A1 | 5/2004 | George et al. |
| 2004/0092311 A1 | 5/2004 | Weston |
| 2004/0097283 A1 | 5/2004 | Piper |
| 2004/0097287 A1 | 5/2004 | Postrel |
| 2004/0104274 A1 | 6/2004 | Kotik et al. |
| 2004/0104845 A1 | 6/2004 | McCarthy |
| 2004/0110565 A1 | 6/2004 | Levesque |
| 2004/0111369 A1 | 6/2004 | Lane et al. |
| 2004/0111515 A1 | 6/2004 | Manion |
| 2004/0118930 A1 | 6/2004 | Berardi et al. |
| 2004/0127277 A1 | 7/2004 | Walker et al. |
| 2004/0127289 A1 | 7/2004 | Davis |
| 2004/0129787 A1 | 7/2004 | Saito |
| 2004/0132530 A1 | 7/2004 | Rutanen |
| 2004/0137983 A1 | 7/2004 | Kerr et al. |
| 2004/0137987 A1 | 7/2004 | Nguyen et al. |
| 2004/0142744 A1 | 7/2004 | Atkinson et al. |
| 2004/0147323 A1 | 7/2004 | Cliff et al. |
| 2004/0152511 A1 | 8/2004 | Nicely |
| 2004/0162124 A1 | 8/2004 | Barton |
| 2004/0162144 A1 | 8/2004 | Loose |
| 2004/0185881 A1 | 9/2004 | Lee et al. |
| 2004/0186768 A1 | 9/2004 | Wakim et al. |
| 2004/0189470 A1 | 9/2004 | Girvin et al. |
| 2004/0192438 A1 | 9/2004 | Wells et al. |
| 2004/0192442 A1 | 9/2004 | Wells et al. |
| 2004/0193469 A1 | 9/2004 | Amaitis et al. |
| 2004/0193531 A1 | 9/2004 | Amaitis et al. |
| 2004/0198386 A1 | 10/2004 | Dupray |
| 2004/0198396 A1 | 10/2004 | Fransioli |
| 2004/0198398 A1 | 10/2004 | Amir et al. |
| 2004/0198403 A1 | 10/2004 | Pedersen et al. |
| 2004/0198483 A1 | 10/2004 | Amaitis et al. |
| 2004/0209660 A1 | 10/2004 | Carlson |
| 2004/0209690 A1 | 10/2004 | Bruzzese |
| 2004/0219961 A1 | 11/2004 | Ellenby |
| 2004/0224769 A1 | 11/2004 | Hansen |
| 2004/0225565 A1 | 11/2004 | Selman |
| 2004/0229685 A1 | 11/2004 | Smith |
| 2004/0229699 A1 | 11/2004 | Gentles et al. |
| 2004/0242297 A1 | 12/2004 | Walker |
| 2004/0242322 A1 | 12/2004 | Montagna |
| 2004/0242332 A1 | 12/2004 | Walker et al. |
| 2004/0243504 A1 | 12/2004 | Asher et al. |
| 2004/0248637 A1 | 12/2004 | Liebenberg et al. |
| 2004/0248653 A1 | 12/2004 | Barros et al. |
| 2004/0259626 A1 | 12/2004 | Akram |
| 2004/0259631 A1 | 12/2004 | Katz et al. |
| 2004/0266533 A1 | 12/2004 | Gentles et al. |
| 2005/0001711 A1 | 1/2005 | Doughty et al. |

(56) References Cited

U.S. PATENT DOCUMENTS

| | | |
|---|---|---|
| 2005/0003881 A1 | 1/2005 | Byng |
| 2005/0003888 A1 | 1/2005 | Asher et al. |
| 2005/0003893 A1 | 1/2005 | Hogwood et al. |
| 2005/0009600 A1 | 1/2005 | Rowe et al. |
| 2005/0014554 A1 | 1/2005 | Walker et al. |
| 2005/0020336 A1 | 1/2005 | Cesare |
| 2005/0020340 A1 | 1/2005 | Cannon |
| 2005/0022453 A1 | 2/2005 | Bosio |
| 2005/0026670 A1 | 2/2005 | Lardie |
| 2005/0026697 A1 | 2/2005 | Balahura |
| 2005/0027643 A1 | 2/2005 | Amaitis et al. |
| 2005/0043996 A1 | 2/2005 | Silver |
| 2005/0049022 A1 | 3/2005 | Mullen |
| 2005/0049949 A1 | 3/2005 | Asher et al. |
| 2005/0054439 A1 | 3/2005 | Rowe et al. |
| 2005/0059397 A1 | 3/2005 | Zhao |
| 2005/0059485 A1 | 3/2005 | Paulsen |
| 2005/0064934 A1 | 3/2005 | Amaitis et al. |
| 2005/0071481 A1 | 3/2005 | Danieli |
| 2005/0086301 A1 | 4/2005 | Eichler et al. |
| 2005/0090294 A1 | 4/2005 | Narasimhan |
| 2005/0091529 A1 | 4/2005 | Manion |
| 2005/0096109 A1 | 5/2005 | McNutt et al. |
| 2005/0096133 A1 | 5/2005 | Hoefelmeyer et al. |
| 2005/0101383 A1 | 5/2005 | Wells |
| 2005/0107022 A1 | 5/2005 | Wichelmann |
| 2005/0107156 A1 | 5/2005 | Potts et al. |
| 2005/0108365 A1 | 5/2005 | Becker et al. |
| 2005/0113172 A1 | 5/2005 | Gong |
| 2005/0116020 A1 | 6/2005 | Smolucha et al. |
| 2005/0130677 A1 | 6/2005 | Meunier et al. |
| 2005/0130728 A1 | 6/2005 | Ngyuen |
| 2005/0131815 A1 | 6/2005 | Fung et al. |
| 2005/0137014 A1 | 6/2005 | Vetelainen |
| 2005/0143169 A1 | 6/2005 | Ngyuen et al. |
| 2005/0144484 A1 | 6/2005 | Wakayama |
| 2005/0159212 A1 | 7/2005 | Romney et al. |
| 2005/0170845 A1 | 8/2005 | Moran |
| 2005/0170886 A1 | 8/2005 | Miller |
| 2005/0170890 A1 | 8/2005 | Rowe et al. |
| 2005/0170892 A1 | 8/2005 | Atkinson |
| 2005/0181859 A1 | 8/2005 | Lind et al. |
| 2005/0181862 A1 | 8/2005 | Asher et al. |
| 2005/0181870 A1 | 8/2005 | Nguyen et al. |
| 2005/0187000 A1 | 8/2005 | Miller |
| 2005/0187020 A1 | 8/2005 | Amaitis et al. |
| 2005/0190901 A1 | 9/2005 | Oborn et al. |
| 2005/0192077 A1 | 9/2005 | Okuniewicz |
| 2005/0193118 A1 | 9/2005 | Le et al. |
| 2005/0193209 A1 | 9/2005 | Saunders et al. |
| 2005/0197189 A1 | 9/2005 | Schultz |
| 2005/0197190 A1 | 9/2005 | Amaitis et al. |
| 2005/0209002 A1 | 9/2005 | Blythe et al. |
| 2005/0215306 A1 | 9/2005 | O'Donnell et al. |
| 2005/0227676 A1 | 10/2005 | De Vries |
| 2005/0234774 A1 | 10/2005 | Dupree |
| 2005/0239523 A1 | 10/2005 | Longman et al. |
| 2005/0239524 A1 | 10/2005 | Longman et al. |
| 2005/0239546 A1 | 10/2005 | Hedrick et al. |
| 2005/0243774 A1 | 10/2005 | Dupree |
| 2005/0245306 A1 | 11/2005 | Asher et al. |
| 2005/0245308 A1 | 11/2005 | Amaitis et al. |
| 2005/0251440 A1 | 11/2005 | Bednarek |
| 2005/0261061 A1 | 11/2005 | Nguyen et al. |
| 2005/0273384 A1 | 12/2005 | Fraser |
| 2005/0277471 A1 | 12/2005 | Russell et al. |
| 2005/0277472 A1 | 12/2005 | Gillan et al. |
| 2005/0282638 A1 | 12/2005 | Rowe et al. |
| 2005/0288937 A1 | 12/2005 | Verdiramo |
| 2006/0005050 A1 | 1/2006 | Basson et al. |
| 2006/0009279 A1 | 1/2006 | Amaitis et al. |
| 2006/0016877 A1 | 1/2006 | Bonalle et al. |
| 2006/0019745 A1 | 1/2006 | Benbrahim |
| 2006/0020558 A1 | 1/2006 | Bonalle |
| 2006/0121987 A1 | 1/2006 | Bortnik et al. |
| 2006/0121992 A1 | 1/2006 | Bortnik et al. |
| 2006/0035707 A1 | 2/2006 | Nguyen et al. |
| 2006/0040717 A1 | 2/2006 | Lind et al. |
| 2006/0040741 A1 | 2/2006 | Grisworld et al. |
| 2006/0052153 A1 | 3/2006 | Vlazny et al. |
| 2006/0058102 A1 | 3/2006 | Nguyen et al. |
| 2006/0058103 A1 | 3/2006 | Danieli |
| 2006/0068917 A1 | 3/2006 | Snoddy et al. |
| 2006/0069711 A1 | 3/2006 | Tsunekawa et al. |
| 2006/0076406 A1 | 4/2006 | Frerking |
| 2006/0093142 A1 | 5/2006 | Schneier et al. |
| 2006/0095790 A1 | 5/2006 | Nguyen et al. |
| 2006/0100019 A1 | 5/2006 | Hornik et al. |
| 2006/0112279 A1 | 5/2006 | Cohen |
| 2006/0116198 A1 | 6/2006 | Leen et al. |
| 2006/0116199 A1 | 6/2006 | Leen et al. |
| 2006/0116200 A1 | 6/2006 | Leen et al. |
| 2006/0121970 A1 | 6/2006 | Khal |
| 2006/0128397 A1 | 6/2006 | Choti |
| 2006/0131391 A1 | 6/2006 | Penuela |
| 2006/0135252 A1 | 6/2006 | Amaitis et al. |
| 2006/0135259 A1 | 6/2006 | Nancke-Krogh et al. |
| 2006/0136296 A1 | 6/2006 | Amada |
| 2006/0136584 A1 | 6/2006 | Decker |
| 2006/0148560 A1 | 7/2006 | Arezina et al. |
| 2006/0148561 A1 | 7/2006 | Moser |
| 2006/0160626 A1 | 7/2006 | Gatto et al. |
| 2006/0161750 A1 | 7/2006 | Perkins |
| 2006/0163346 A1 | 7/2006 | Lee et al. |
| 2006/0165235 A1 | 7/2006 | Carlson |
| 2006/0166740 A1 | 7/2006 | Sufuentes |
| 2006/0173754 A1 | 8/2006 | Burton et al. |
| 2006/0178216 A1 | 8/2006 | Shea et al. |
| 2006/0183522 A1 | 8/2006 | Leen et al. |
| 2006/0184417 A1 | 8/2006 | Van der Linden et al. |
| 2006/0187029 A1 | 8/2006 | Thomas |
| 2006/0189382 A1 | 8/2006 | Muir et al. |
| 2006/0194589 A1 | 8/2006 | Saniska |
| 2006/0199649 A1 | 9/2006 | Soltys et al. |
| 2006/0205489 A1 | 9/2006 | Carpenter et al. |
| 2006/0205497 A1 | 9/2006 | Wells et al. |
| 2006/0209810 A1 | 9/2006 | Krzyzanowski et al. |
| 2006/0224046 A1 | 10/2006 | Ramadas et al. |
| 2006/0229520 A1 | 10/2006 | Yamashita |
| 2006/0234631 A1 | 10/2006 | Dieguez |
| 2006/0234791 A1 | 10/2006 | Nguyen et al. |
| 2006/0236395 A1 | 10/2006 | Barker et al. |
| 2006/0240856 A1 | 10/2006 | Counts |
| 2006/0242234 A1 | 10/2006 | Counts |
| 2006/0242237 A1 | 10/2006 | Manion |
| 2006/0242639 A1 | 10/2006 | Manion |
| 2006/0246990 A1 | 11/2006 | Downes |
| 2006/0247026 A1 | 11/2006 | Walker et al. |
| 2006/0247039 A1 | 11/2006 | Lerner et al. |
| 2006/0247041 A1 | 11/2006 | Walker et al. |
| 2006/0247053 A1 | 11/2006 | Mattila |
| 2006/0248584 A1 | 11/2006 | Kelly |
| 2006/0252501 A1 | 11/2006 | Little et al. |
| 2006/0252530 A1 | 11/2006 | Oberberger et al. |
| 2006/0258429 A1 | 11/2006 | Manning et al. |
| 2006/0277098 A1 | 12/2006 | Chung et al. |
| 2006/0277308 A1 | 12/2006 | Morse et al. |
| 2006/0277413 A1 | 12/2006 | Drews |
| 2006/0281541 A1 | 12/2006 | Nguyen et al. |
| 2006/0287092 A1 | 12/2006 | Walker et al. |
| 2006/0287098 A1 | 12/2006 | Morrow et al. |
| 2006/0293965 A1 | 12/2006 | Burton |
| 2007/0001841 A1 | 1/2007 | Anders et al. |
| 2007/0003034 A1 | 1/2007 | Schultz et al. |
| 2007/0008987 A1 | 1/2007 | Manion |
| 2007/0015564 A1 | 1/2007 | Walker et al. |
| 2007/0021213 A1 | 1/2007 | Foe et al. |
| 2007/0026939 A1 | 2/2007 | Asher et al. |
| 2007/0030154 A1 | 2/2007 | Aiki et al. |
| 2007/0032301 A1 | 2/2007 | Acres et al. |
| 2007/0054739 A1 | 3/2007 | Amaitis et al. |
| 2007/0060305 A1 | 3/2007 | Amaitis et al. |
| 2007/0060306 A1 | 3/2007 | Amaitis et al. |
| 2007/0060312 A1 | 3/2007 | Dempsey et al. |

(56) References Cited

U.S. PATENT DOCUMENTS

| | | |
|---|---|---|
| 2007/0060326 A1 | 3/2007 | Juds et al. |
| 2007/0060355 A1 | 3/2007 | Amaitis et al. |
| 2007/0060358 A1 | 3/2007 | Amaitis et al. |
| 2007/0066401 A1 | 3/2007 | Amaitis |
| 2007/0066402 A1 | 3/2007 | Amaitis |
| 2007/0087834 A1 | 4/2007 | Moser et al. |
| 2007/0087843 A1 | 4/2007 | Steil et al. |
| 2007/0093296 A1 | 4/2007 | Asher et al. |
| 2007/0099697 A1 | 5/2007 | Nelson |
| 2007/0099703 A1 | 5/2007 | Terebilo |
| 2007/0117604 A1 | 5/2007 | Hill |
| 2007/0117634 A1 | 5/2007 | Hamilton et al. |
| 2007/0130044 A1 | 6/2007 | Rowan |
| 2007/0136817 A1 | 6/2007 | Nguyen |
| 2007/0167237 A1 | 7/2007 | Wang et al. |
| 2007/0168570 A1 | 7/2007 | Martin et al. |
| 2007/0181676 A1 | 8/2007 | Mateen et al. |
| 2007/0190494 A1 | 8/2007 | Rosenberg |
| 2007/0191719 A1 | 8/2007 | Yamashita et al. |
| 2007/0213120 A1 | 9/2007 | Beal et al. |
| 2007/0233585 A1 | 10/2007 | Ben Simon et al. |
| 2007/0235807 A1 | 10/2007 | Sobel et al. |
| 2007/0238443 A1 | 10/2007 | Richardson |
| 2007/0241187 A1 | 10/2007 | Alderucci et al. |
| 2007/0243927 A1 | 10/2007 | Soltys |
| 2007/0243935 A1 | 10/2007 | Huizinga |
| 2007/0257101 A1 | 11/2007 | Alderucci et al. |
| 2007/0258507 A1 | 11/2007 | Lee et al. |
| 2007/0259717 A1 | 11/2007 | Mattice et al. |
| 2007/0275779 A1 | 11/2007 | Amaitis |
| 2007/0281782 A1 | 12/2007 | Amaitis |
| 2007/0281785 A1 | 12/2007 | Amaitis |
| 2007/0281792 A1 | 12/2007 | Amaitis |
| 2007/0282959 A1 | 12/2007 | Stern |
| 2008/0004121 A1 | 1/2008 | Gatto et al. |
| 2008/0009344 A1 | 1/2008 | Graham et al. |
| 2008/0013787 A1 | 1/2008 | Kobayashi |
| 2008/0015013 A1 | 1/2008 | Gelman et al. |
| 2008/0022089 A1 | 1/2008 | Leedom |
| 2008/0026829 A1 | 1/2008 | Martin et al. |
| 2008/0026844 A1 | 1/2008 | Wells et al. |
| 2008/0032801 A1 | 2/2008 | Brunet de Courssou |
| 2008/0039196 A1 | 2/2008 | Walther et al. |
| 2008/0051193 A1 | 2/2008 | Kaminkow et al. |
| 2008/0066111 A1 | 3/2008 | Ellis et al. |
| 2008/0076505 A1 | 3/2008 | Nguyen et al. |
| 2008/0076506 A1 | 3/2008 | Nguyen et al. |
| 2008/0076572 A1 | 3/2008 | Nguyen et al. |
| 2008/0085752 A1 | 4/2008 | Okada |
| 2008/0096628 A1 | 4/2008 | Czyzewski et al. |
| 2008/0096659 A1 | 4/2008 | Kreloff et al. |
| 2008/0102956 A1 | 5/2008 | Burman et al. |
| 2008/0102957 A1 | 5/2008 | Burman et al. |
| 2008/0108423 A1 | 5/2008 | Benbrahim et al. |
| 2008/0113785 A1 | 5/2008 | Alderucci et al. |
| 2008/0113786 A1 | 5/2008 | Alderucci et al. |
| 2008/0113816 A1 | 5/2008 | Mahaffey et al. |
| 2008/0132251 A1 | 6/2008 | Altman et al. |
| 2008/0139306 A1 | 6/2008 | Lutnick et al. |
| 2008/0146323 A1 | 6/2008 | Hardy et al. |
| 2008/0150678 A1 | 6/2008 | Giobbi et al. |
| 2008/0182644 A1 | 7/2008 | Lutnick et al. |
| 2008/0195664 A1 | 8/2008 | Maharajh et al. |
| 2008/0207302 A1 | 8/2008 | Lind et al. |
| 2008/0214261 A1 | 9/2008 | Alderucci et al. |
| 2008/0218312 A1 | 9/2008 | Asher et al. |
| 2008/0220871 A1 | 9/2008 | Asher et al. |
| 2008/0221396 A1 | 9/2008 | Garces et al. |
| 2008/0224822 A1 | 9/2008 | Asher et al. |
| 2008/0254897 A1 | 10/2008 | Saunders et al. |
| 2008/0305856 A1 | 12/2008 | Walker et al. |
| 2008/0305867 A1 | 12/2008 | Guthrie |
| 2008/0311994 A1 | 12/2008 | Amaitis et al. |
| 2008/0318670 A1 | 12/2008 | Zinder et al. |
| 2009/0049542 A1 | 2/2009 | DeYonker et al. |
| 2009/0055204 A1 | 2/2009 | Pennington et al. |
| 2009/0077645 A1 | 3/2009 | Kottahachchi |
| 2009/0088232 A1 | 4/2009 | Amaitis et al. |
| 2009/0098925 A1 | 4/2009 | Gagner et al. |
| 2009/0117989 A1 | 5/2009 | Arezina et al. |
| 2009/0149233 A1 | 6/2009 | Strause et al. |
| 2009/0163272 A1 | 6/2009 | Baker et al. |
| 2009/0178118 A1 | 7/2009 | Cedo et al. |
| 2009/0183208 A1 | 7/2009 | Christensen et al. |
| 2009/0197684 A1 | 8/2009 | Arezina et al. |
| 2009/0204905 A1 | 8/2009 | Toghia |
| 2009/0209233 A1 | 8/2009 | Morrison |
| 2009/0312032 A1 | 12/2009 | Bornstein et al. |
| 2009/0325708 A9 | 12/2009 | Kerr |
| 2010/0023372 A1 | 1/2010 | Gonzalez |
| 2010/0062834 A1 | 3/2010 | Ryan |
| 2010/0069144 A1 | 3/2010 | Curtis |
| 2010/0069158 A1 | 3/2010 | Kim |
| 2010/0075760 A1 | 3/2010 | Shimabukuro et al. |
| 2010/0113143 A1 | 5/2010 | Gagner et al. |
| 2010/0127919 A1 | 5/2010 | Curran et al. |
| 2010/0153511 A1 | 6/2010 | Lin |
| 2010/0205255 A1 | 8/2010 | Alderucci |
| 2010/0211431 A1 | 8/2010 | Lutnick |
| 2010/0227691 A1 | 9/2010 | Karsten |
| 2010/0240455 A1 | 9/2010 | Gagner et al. |
| 2011/0035431 A1 | 2/2011 | Geary |
| 2011/0269520 A1 | 11/2011 | Amaitis et al. |
| 2012/0190452 A1 | 7/2012 | Weston et al. |
| 2013/0065672 A1 | 3/2013 | Gelman et al. |
| 2013/0065679 A1 | 3/2013 | Gelman et al. |
| 2013/0072295 A1 | 3/2013 | Alderucci et al. |
| 2013/0084933 A1 | 4/2013 | Amaitis et al. |
| 2013/0165212 A1 | 6/2013 | Amaitis et al. |
| 2013/0165213 A1 | 6/2013 | Alderucci et al. |
| 2013/0165221 A1 | 6/2013 | Alderucci et al. |
| 2013/0178277 A1 | 7/2013 | Burman et al. |
| 2013/0210513 A1 | 8/2013 | Nguyen |
| 2013/0244742 A1 | 9/2013 | Amaitis et al. |
| 2013/0260878 A1 | 10/2013 | Saunders et al. |
| 2014/0057724 A1 | 2/2014 | Alderucci et al. |
| 2014/0113707 A1 | 4/2014 | Asher et al. |
| 2014/0200465 A1 | 7/2014 | McIntyre |
| 2014/0220514 A1 | 8/2014 | Waldron et al. |
| 2014/0228127 A1 | 8/2014 | Alderucci et al. |
| 2014/0288401 A1 | 9/2014 | Ouwerkerk |
| 2014/0300491 A1 | 10/2014 | Chen |
| 2015/0080111 A1 | 3/2015 | Amaitis et al. |
| 2015/0141131 A1 | 5/2015 | Gelman et al. |
| 2015/0157947 A1 | 6/2015 | Amaitis et al. |
| 2015/0238857 A1 | 8/2015 | Amaitis et al. |
| 2015/0243135 A1 | 8/2015 | Lutnick et al. |
| 2016/0054838 A1 | 2/2016 | Amaitis et al. |
| 2016/0321864 A1 | 11/2016 | Burman et al. |
| 2017/0039806 A1 | 2/2017 | Alderucci et al. |
| 2017/0091435 A1 | 3/2017 | Alderucci et al. |
| 2017/0144065 A1 | 5/2017 | Amaitis et al. |

FOREIGN PATENT DOCUMENTS

| | | |
|---|---|---|
| DE | 37 36 770 A1 | 5/1989 |
| DE | 43 16 652 A1 | 11/1994 |
| DE | 19922862 | 12/2000 |
| DE | 19944140 | 3/2001 |
| DE | 19952691 | 5/2001 |
| DE | 19952692 | 5/2001 |
| DE | 10060079 | 6/2002 |
| EP | 0 840 639 B1 | 7/1996 |
| EP | 0 506 873 B1 | 3/2000 |
| EP | 1045346 | 10/2000 |
| EP | 1063622 | 12/2000 |
| EP | 1 066 868 A2 | 1/2001 |
| EP | 1066867 | 1/2001 |
| EP | 1120757 | 1/2001 |
| EP | 1 202 528 A3 | 5/2002 |
| EP | 1217792 | 6/2002 |
| EP | 1231577 | 8/2002 |
| EP | 1291830 A2 | 3/2003 |
| EP | 1 475 755 A1 | 12/2003 |

(56) References Cited

FOREIGN PATENT DOCUMENTS

| | | |
|---|---|---|
| EP | 1 475 756 A2 | 11/2004 |
| EP | 1480102 A2 | 11/2004 |
| EP | 1 531 646 A1 | 5/2005 |
| EP | 1259930 B1 | 6/2005 |
| EP | 1480102 A3 | 10/2008 |
| GB | 2 248 404 | 4/1992 |
| GB | 2 256 594 | 12/1992 |
| GB | 2 391 432 | 2/2004 |
| GB | 2 391 767 | 2/2004 |
| GB | 2394675 | 5/2004 |
| GB | 2 406 291 | 3/2005 |
| JP | H11-220766 | 1/1988 |
| JP | 5-317485 | 12/1993 |
| JP | H07-281780 | 10/1995 |
| JP | H09-182143 | 7/1997 |
| JP | 2000-69540 | 8/1998 |
| JP | 2000049046 | 2/2000 |
| JP | 2000-160016 | 6/2000 |
| JP | 200218125 | 7/2000 |
| JP | 200326491 | 10/2000 |
| JP | 200345435 | 11/2000 |
| JP | 200387614 | 12/2000 |
| JP | 2001-70658 | 3/2001 |
| JP | 2001-204971 | 7/2001 |
| JP | 2001-204972 | 7/2001 |
| JP | 2001/212363 | 8/2001 |
| JP | 2001 236458 | 8/2001 |
| JP | 2001-514909 | 9/2001 |
| JP | 2001-340656 | 12/2001 |
| JP | 2001-344400 | 12/2001 |
| JP | 2001-526550 | 12/2001 |
| JP | 2002 032515 | 1/2002 |
| JP | 2002-049681 | 2/2002 |
| JP | 2002-056270 | 2/2002 |
| JP | 2002107224 | 2/2002 |
| JP | 2002-661444 | 3/2002 |
| JP | 2002-109376 | 4/2002 |
| JP | 2002-123642 | 4/2002 |
| JP | 2002-66144 | 5/2002 |
| JP | 2002 133009 | 5/2002 |
| JP | 2002-135468 | 5/2002 |
| JP | 2002-175296 | 6/2002 |
| JP | 2002 189831 | 7/2002 |
| JP | 2002-253866 | 9/2002 |
| JP | 2002-263375 | 9/2002 |
| JP | 2002-279157 | 9/2002 |
| JP | 2002-292113 | 10/2002 |
| JP | 2003-053042 | 2/2003 |
| JP | 2003-062353 | 3/2003 |
| JP | 2003 078591 | 3/2003 |
| JP | 2003-518677 | 6/2003 |
| JP | 2003166050 | 6/2003 |
| JP | 2003-210831 | 7/2003 |
| JP | 2003-210852 | 7/2003 |
| JP | 2003 228642 | 8/2003 |
| JP | 2002024979 | 8/2003 |
| JP | 2004-136009 | 4/2004 |
| JP | 2004-512865 | 4/2004 |
| JP | 2002 149894 | 5/2004 |
| JP | 2004-261202 | 9/2004 |
| JP | 2004-321558 | 11/2004 |
| JP | 2004-329948 | 11/2004 |
| JP | 2004-536638 | 12/2004 |
| JP | 2005 005936 | 1/2005 |
| JP | 2005-027853 | 2/2005 |
| JP | 2005-073711 | 3/2005 |
| JP | 2006-072468 | 3/2006 |
| JP | 2007-011420 | 1/2007 |
| RU | 2190477 | 10/2002 |
| WO | WO 80/02512 A1 | 11/1980 |
| WO | WO93/10508 | 5/1993 |
| WO | WO 94/10658 | 5/1994 |
| WO | WO 94/16416 | 7/1994 |
| WO | WO 95/24689 | 9/1995 |
| WO | WO 95/24689 A1 | 9/1995 |
| WO | WO 95/30944 | 11/1995 |
| WO | WO 96/00950 A1 | 1/1996 |
| WO | WO 96/15837 A1 | 5/1996 |
| WO | WO97/44750 | 11/1997 |
| WO | WO 98/09694 A1 | 3/1998 |
| WO | WO 99/04873 A1 | 2/1999 |
| WO | WO 99/08762 A1 | 2/1999 |
| WO | WO 99/12135 | 3/1999 |
| WO | WO 99/19027 | 4/1999 |
| WO | WO99/42964 | 8/1999 |
| WO | WO 99/52077 | 10/1999 |
| WO | WO 1999/055102 | 10/1999 |
| WO | WO 00/77753 A1 | 12/2000 |
| WO | 01/20538 | 3/2001 |
| WO | WO 01/17262 A1 | 3/2001 |
| WO | WO 02/37246 | 5/2001 |
| WO | WO 01/40978 A2 | 6/2001 |
| WO | WO 01/48712 A1 | 7/2001 |
| WO | WO 01/48713 | 7/2001 |
| WO | WO 01/48713 A1 | 7/2001 |
| WO | WO 01/54091 | 7/2001 |
| WO | 01/67218 | 9/2001 |
| WO | WO 01/77861 | 10/2001 |
| WO | WO 01/82176 | 11/2001 |
| WO | WO 01/84817 A1 | 11/2001 |
| WO | WO 01/89233 A3 | 11/2001 |
| WO | WO 02/10931 A1 | 2/2002 |
| WO | WO 02/21457 A1 | 3/2002 |
| WO | WO 02/31739 | 4/2002 |
| WO | WO 02/39605 A1 | 5/2002 |
| WO | WO 02/41199 A3 | 5/2002 |
| WO | WO 02/47042 | 6/2002 |
| WO | WO 02/065750 A2 | 8/2002 |
| WO | WO 02/071351 A2 | 9/2002 |
| WO | WO 02/077931 A1 | 10/2002 |
| WO | WO02/101486 | 12/2002 |
| WO | WO 02/101486 A3 | 12/2002 |
| WO | WO 2003/005743 | 1/2003 |
| WO | 03/015299 A1 | 2/2003 |
| WO | WO 03/013678 A1 | 2/2003 |
| WO | WO 2003/015299 | 2/2003 |
| WO | WO 03/021543 | 3/2003 |
| WO | WO 03/027970 A2 | 4/2003 |
| WO | 03/045519 | 6/2003 |
| WO | 03/081447 | 10/2003 |
| WO | WO 2004/000428 A1 | 12/2003 |
| WO | WO 2004/003810 A1 | 1/2004 |
| WO | WO 2004/013820 | 2/2004 |
| WO | WO 2004/014506 A1 | 2/2004 |
| WO | WO 2004/023253 A3 | 3/2004 |
| WO | 2004/027689 A2 | 4/2004 |
| WO | WO 2004/027689 | 4/2004 |
| WO | WO 2004/034223 | 4/2004 |
| WO | WO 2004/073812 A2 | 9/2004 |
| WO | WO 2004/095383 | 11/2004 |
| WO | WO 2004/104763 A2 | 12/2004 |
| WO | WO 2004/109321 | 12/2004 |
| WO | WO 2004/114235 A1 | 12/2004 |
| WO | WO 2005/001651 | 1/2005 |
| WO | WO 2005/015458 A1 | 2/2005 |
| WO | WO 2005/022453 | 3/2005 |
| WO | WO 2005/026870 A2 | 3/2005 |
| WO | WO 2005/031627 A1 | 4/2005 |
| WO | WO 2005/031666 A1 | 4/2005 |
| WO | WO 2005/036425 A1 | 4/2005 |
| WO | WO 2005/050574 A2 | 6/2005 |
| WO | WO 2005/082011 | 9/2005 |
| WO | WO 2005/085980 | 9/2005 |
| WO | WO2005/098650 | 10/2005 |
| WO | 2006/023230 | 3/2006 |
| WO | WO 2007/008601 A2 | 1/2007 |
| WO | WO97/19537 | 5/2007 |

(56) References Cited

FOREIGN PATENT DOCUMENTS

| WO | WO 2008/005264 | 1/2008 |
|---|---|---|
| WO | WO 2008/016610 | 2/2008 |

OTHER PUBLICATIONS

IPR Decision for U.S. Pat. No. 9,306,952, Case IPR2017-01333, Nov. 13, 2017 (30 pages).
Patent Owner's Preliminary Response for U.S. Pat. No. 9,306,952, Case IPR2017-01333, Aug. 16, 2017 (49 pages).
Petition for Inter Partes Review of U.S. Pat. No. 9,306,952, Case IPR2017-01333, May 1, 2017 (74 pages).
IPR Decision for U.S. Pat. No. 9,355,518, Case IPR2017-01532, Dec. 13, 2017 (29 pages).
Patent Owner's Preliminary Response for U.S. Pat. No. 9,355,518, Case IPR2017-01532, Sep. 19, 2017 (27 pages).
Petition for Inter Partes Review of U.S. Pat. No. 9,355,518, Case IPR2017-01532, Jun. 8, 2017 (74 pages).
ImagiNation—OnLine Games, 1995, 58 pages.
ImagiNation, 1993 ImagiNation Network—A Quick Guide to Using Your Imagination, 16 pages.
ImagiNation Network [R] General Documentation (INN), 27 pages.
BYTE Magazine, Mar. 1984, vol. 9, No. 3 (552 pages).
IBM Technical Reference, 1$^{st}$ Ed. Revised, Nov. 1983 (572 pages).
IBM PC Jr. Advertising Booklet, 1983, 14 pages.
IBM PC Jr. Order Form, Nov. 1983, 2 pages.
Sierra 3-D Animated Adventure Game Reference Card for MS DOS, 1987 (4 pages).
Leisure Suit Larry in the Land of the Lounge Lizards Manual, Jun. 4, 1987, 13 pages.
Electronic Gaming Monthly, No. 89, Dec. 1996 (352 pages).
Wireless Pro Fighter 8 Box Cover (1 page), Dec. 1996.
Naki Wireless Pro Fighter 8 controller (1 page), Dec. 1996.
Sega Saturn Instruction Manual (24 pages), May 11, 1995.
Sega Saturn Overview Manual (67 pages), Jun. 27, 1995.
Sega Saturn Overview Manual unlocked (67 pages), Jun. 27, 1995.
Sega Saturn Introduction Manual (10 pages), Jun. 27, 1995.
Game FAQs: Tokimeki Memorial: Forever With You, Dec. 13, 1996 (17 pages).
How to get the most out of CompuServe, Charles Bowen and David Peyton, 1986 (58 pages).
Alfred Glossbrenner's Master Guide to Compuserve, 1987 (25 pages).
CompuServe Information Service Users Guide, Sep. 1986 (42 pages).
The Official Guide to the Prodigy Service, John L. Vierscas, 1998 (77 pages).
Wireless Gaming Makes Strides in Nevada by Libe Goad, PCMag.com, Jun. 9, 2005 (3 pages).
Guinn gives OK to wireless gaming devices in casinos by Elizabeth White, Las Vegas Sun, Jun. 2, 2005 (8 pages).
Welcome to Cantor Casino, Wayback machine, Oct. 2005 (1 page).
Hand-held devices next wave in gaming, The Times, Aug. 12, 2005 (1 page).
Rolling the dice, Casinos ready to put their money on wireless gaming devices, The Journal News, Nov. 14, 2005 (2 pages).
Nevada Oks gambling on the go, The Courier Journal, Apr. 2, 2006 (1 page).
Devices could bring mobile gaming to casinos, Reno Gazette-Journal, Mar. 24, 2006 (2 pages).
Regulators approve wireless device by Ryan Randazzo, Reno Gazette Journal, Aug. 25, 2006.
Nevada Gaming Commission Mobile Gaming Policies, May 18, 2006 (5 pages).
Handheld gambling devices will show up soon in casinos by the Associated Press in the Florida Today Newspaper Aug. 3, 2005 (1 page).
Cantor Fitzgerald Press Release—Cantor Fitzgerald Launches Cantor Casino and Cantor Gaming, Sep. 29, 2005 (2 pages).
Coming to a Nevada casino soon: Playing the slots wirelessly, by the New York Times in the Arizona Republic Newspaper—Fox Butterfield, Jul. 4, 2005 (1 page).
Minutes of the Meeting on the Assembly Committee on Judiciary, Seventy-Third Session, Apr. 8, 2005 (42 pages).
O2 and Cantor Index bring gambling to PDAs by Jo Best of ZDNet, Sep. 3, 2003 (6 pages).
Stocking fillers by Ashley Norton of the Guardian, Sep. 20, 2003 (5 pages).
O2 XDA II Coming November by Fabrizio Pilato of Mobile Mag, Oct. 23, 2003 (6 pages).
Securities and Exchange Commission—The XDA II from O2 Corners a Third of the Market in First Six Months Jul. 15, 2004 (3 pages).
Final Notice to Cantor Index Limited from the Financial Services Authority, Dec. 30, 2004 (13 pages).
Handheld devices can be used for games in Casino public areas by the Associated Press in NBC News, Mar. 24, 2006 (2 pages).
Nevada approves new mobile gambling rules, GMA News Online, Mar. 24, 2006 (5 pages).
Legalized Gambling as a Strategy for Economic Development by Robert Goodman Mar. 1994 (225 pages.
New York Times—Two inventors contend that the V-chip is an idea they've seen before—in their own patent.—By Teresa Riordan Oct. 28, 1996 (4 pages).
Wireless ATM & Ad-Hoc Networks by C-K Toh, Dec. 31, 1996 (23 pages).
PC Mag—Wireless Gaming Makes Strides in Nevada, Jun. 9, 2005 (3 pages).
The Times Money, Hanld-held devices next wave in gaming, Aug. 12, 2005 (1 page).
AOL—The Official America Online Tour Guide for Windows 3.1, 1996 Tom Lichty, Jul. 1996 (14 pages).
Business Wire—Diamond I Opens Online Interactive Demo of its WifiCasino GS Gaming System, Apr. 27, 2005 (3 pages).
Diamond I PRN Wire Diamond I Comments on Future of Hand-held Gambling Devices in Nevada, Jun. 2, 2005 (4 pages).
Diamond I Rolls the Dice by Naomi Graychase, Feb. 23, 2005 (3 pages).
Diamond I Opens Online Interactive Demo of its WifiCasino GS Gaming System, Business Wire, Apr. 27, 2005 (3 pages).
Diamond I Responds to Inquiries: What is "WifiCasino GS"?, Business Wire, Jan. 27, 2005 (3 pages).
Diamond I Technologies—Products, Wayback Machine, Apr. 29, 2005-Aug. 12, 2007, (2 pages).
Kidnet, Kid's Guide to Surfing through Cyberspace by Brad and Debra Schepp—Nov. 1995 (9 pages).
The New York Times—Nintendo and Minnesota Set a Living-Room Lottery Test, Sep. 27, 1991, (4 pages).
The New York Times—Minnesota Cancels Plan to Play Lottery on Nintendo, Oct. 19, 1991 (3 pages).
Case 2:16-cv-00856-RCJ-VCF, Document 1, "Plaintiffs' Complaint for Patent Infringement" filed Apr. 14, 2016 (39 pages).
Case 2:16-cv-00856-RCJ-VCF, Document 19, "Plaintiffs' First Amended Complaint for Patent Infringement", filed Jul. 11, 2016 (57 pages).
Case 2:16-cv-00856-RCJ-VCF, Document 23, "Defendant 888's Motion to Dismiss Plaintiffs First Amended Complaint Under Fed. R. Civ. P. 12(B)(6)", filed Aug. 12, 2016 (22 pages).
Case 2:16-cv-00856-RCJ-VCF, Document 26, "Defendant's Notice of Joinder to Motions to Dismiss in Related Cases", filed Aug. 12, 2016 (4 pages).
Case 2:16-cv-00856-RCJ-VCF, Document 36, "Plaintiffs' Opposition to 888 Holdings PLC's Motion to Dismiss", filed Sep. 8, 2016 (32 pages).
Case 2:16-cv-00856-RCJ-VCF, Document 37, "Index of Exhibits to Plaintiffs' Opposition to Defendant's Motion to Dismiss" filed Sep. 8, 2016 (3 pages).
Case 2:16-cv-00856-RCJ-VCF, Document 45, Defendant 888's Reply in Support to Dismiss Plaintiffs' First Amended Complaint Under Fed. R. Civ. P. 12(B)(6), filed Sep. 26, 2016 (19 pages).

(56) References Cited

OTHER PUBLICATIONS

Case 2:16-cv-00856-RCJ-VCF, Document 46, Defendant 888's Reply in Support of Motion to Dismiss Plaintiffs' First Amended Complaint Under Fed. R. Civ. P. 12(B)(6), filed Sep. 26, 2016 (19 pages).
Case 2:16-cv-00856-RCJ-VCF, Document 54, "Order", filed Dec. 6, 2016 (8 pages).
Case 2:16-cv-00856-RCJ-VCF, Document 57, "Defendant 888's Holdings PLC's Answer to Plaintiffs' First Amended Complaint", filed Jan. 18, 2017 (67 pages).
Case 2:16-cv-00857-APG-VCF, Document 1, "Plaintiffs' Complaint for Patent Infringement" filed Apr. 14, 2016 (29 pages).
Case 2:16-cv-00857-RCJ-VCF, Document 27, "Defendant Big Fish Games, Inc.'s Motion to Dismiss", filed Jun. 17, 2016 (30 pages).
Case 2:16-cv-00857-RCJ-VCF, Document 33, "Plaintiffs' Opposition to Big Fish Games, Inc.'s Motion to Dismiss", filed Jul. 25, 2016 (32 pages).
Case 2:16-cv-00857-RCJ-VCF, Document 34, "Reply in Support of Defendant Big Fish Games, Inc.'s Motion to Dismiss", filed Aug. 4, 2016 (17 pages).
Case 2:16-cv-00857-RCJ-VCF, Document 36, "Order" filed Jul. 19, 2019 (29 pages).
Case 2:16-cv-00857-RCJ-VCF, Document 37, "Plaintiffs' First Amended Complaint for Patent Infringement", filed Sep. 28, 2016 (38 pages).
Case 2:16-cv-00857-RCJ-VCF, Document 39, "Defendant Big Fish Games, Inc.'s Motion to Dismiss Plaintiffs' First Amended Complaint", filed Oct. 12, 2016 (17 pages).
Case 2:16-cv-00857-RCJ-VCF, Document 45, "Plaintiffs' Opposition to Big Fish Games, Inc.'s Motion to Dismiss", filed Oct. 31, 2016 (22 pages).
Case 2:16-cv-00857-RCJ-VCF, Document 49, "Reply in Support of Defendant Big Fish Games, Inc.'s Motion to Dismiss", filed Nov. 10, 2016 (16 pages).
Case 2:16-cv-00857-RCJ-VCF, Document 59, "Order", filed Jan. 4, 2017 (9 pages).
Case 2:16-cv-00857-RCJ-VCF, Document 60, "Defendant Big Fish Games, Inc.'s Answer to First Amended Complaint", filed Jan. 19, 2017 (17 pages).
Case 2:16-cv-00871-JAD-VCF, Document 1, "Plaintiffs' Complaint for Patent Infringement" filed Apr. 15, 2016 (39 pages).
Case 2:16-cv-00871-JAD-VCF, Document 23, "Plaintiffs' First Amended Complaint for Patent Infringement" filed Jul. 11, 2016 (57 pages).
Case 2:16-cv-00871-JAD-VCF, Document 31, "Motion to Dismiss Under 35 U.S.C. §101" filed Aug. 12, 2016 (16 pages).
Case 2:16-cv-00871-RCJ-VCF, Document 35, "Plaintiffs' Opposition to Defendants' Motion to Dismiss" filed Sep. 8, 2016 (25 pages).
Case 2:16-cv-00871-RCJ-VCF, Document 42, "Order" filed Oct. 18, 2016 (15 pages).
Case 2:16-cv-00871-RCJ-VCF, Document 46, "Motion for Reconsideration" filed Oct. 31, 2016 (7 pages).
Case 2:16-cv-00871-RCJ-VCF, Document 47, Motion to Dismiss Under Fed. R. Civ. P. 12(6)(6) filed Nov. 1, 2016 (7 pages).
Case 2:16-cv-00871-RCJ-VCF, Document 49, "Plaintiffs' Opposition to Defendants' Motion for Reconsideration", filed Nov. 17, 2016 (11 pages).
Case 2:16-cv-00871-RCJ-VCF, Document 50, "Plaintiffs' Opposition to Defendants' Motion to Dismiss", filed Nov. 17, 2016 (12 pages).
Case 2:16-cv-00871-RCJ-VCF, Document 55, Reply in Support of Defendants' Motion to Dismiss Under Fed. R. Civ. P. 12(6)(6), filed Nov. 30, 2016 (6 pages).
Case 2:16-cv-00871-RCJ-VCF, Document 56, "Reply in Support of Motion for Reconsideration" filed Nov. 30, 2016 (7 pages).
Case 2:16-cv-00871-RCJ-VCF, Document 63, "Order" filed Jan. 4, 2017 (10 pages).
Case 2:16-cv-00871-RCJ-VCF, Document 64, "Bwin's Answer to Plaintiffs' First Amended Complaint" filed Jan. 6, 2017 (15 pages).
Case 2:16-cv-00858-MMD-GWF, Document 1, "Plaintiffs' Complaint for Patent Infringement" filed Apr. 14, 2016 (30 pages).
Case 2:16-cv-00858-RCJ-VCF, Document 19, "Defendant Double Down Interactive LLC's Motion to Dismiss", filed Jun. 7, 2016 (32 pages).
Case 2:16-cv-00858-RCJ-VCF, Document 30, "Plaintiffs' Opposition to Double Down's Motion to Dismiss", filed Jul. 8, 2016 (31 pages).
Case 2:16-cv-00858-RCJ-VCF, Document 51, "Reply in Support of Defendant Double Down Interactive LLC's Motion to Dismiss", filed Jul. 18, 2016 (14 pages).
Case 2:16-cv-00858-RCJ-VCF, Document 58, "Plaintiffs' First Amended Complaint for Patent Infringement", filed Sep. 28, 2016 (38 pages).
Case 2:16-cv-00858-RCJ-VCF, Document 63, "Defendant Double Down Interactive LLC's Motion to Dismiss Plaintiffs' First Amended Complaint for Patent Infringement", Oct. 17, 2016 (31 pages).
Case 2:16-cv-00858-RCJ-VCF, Document 69, "Plaintiffs' Opposition to Double Down Interactive, Inc.'s Motion to Dismiss", filed Nov. 3, 2016 (24 pages).
Case 2:16-cv-00858-RCJ-VCF, Document 76, "Defendant Double Down Interactive LLC's Reply in Support of Motion to Dismiss Plaintiffs' First Amended Complaint for Patent Infringement", filed Nov. 14, 2016 (18 pages).
Case 2:16-cv-00858-RCJ-VCF, Document 83, "Defendant Double Down Interactive LLC's Answer, Defenses, and Counterclaims to Plaintiffs' First Amended Complaint for Patent Infringement", filed Jan. 18, 2017 (19 pages).
Case 2:16-cv-00858-RCJ-VCF, Document 84, "Plaintiffs' Answer to Double Down Interactive LLC's Counterclaims Against CG Technology Development, LLC", filed Feb. 8, 2017 (4 pages).
Case 2:16-cv-00781-RFB-CWH, Document 1, "Plaintiffs' Complaint for Patent Infringement" filed Apr. 7, 2016 (33 pages).
Case 2:16-cv-00781-MMD-CWH, Document 29, "Plaintiffs' First Amended Complaint for Patent Infringement" filed Jun. 13, 2016 (42 pages).
Case 2:16-cv-00781-MMD-CWH, Document 37, "Defendant's Motion to Dismiss Plaintiffs' Amended Complaint Under Fed.R. Civ. P. 12(B)(6)" filed Jul. 29, 2016 (38 pages).
Case 2:16-cv-00781-MMD-CWH, Document 44, "Defendant's Motion for Protective Order Staying Discovery Pending Ruling on Motion to Dismiss" filed Aug. 22, 2016 (12 pages).
Case 2:16-cv-00781-MMD-CWH, Document 45, "Plaintiffs' Opposition to DraftKings, Inc.'s Motion to Dismiss" filed Aug. 24, 2016 (38 pages).
Case 2:16-cv-00781-MMD-CWH, Document 50, "Plaintiffs' Opposition to DraftKings, Inc.'s Motion to Stay" filed Sep. 8, 2016 (12 pages).
Case 2:16-cv-00781-MMD-CWH, Document 57, "Defendant's Reply in Support of it's Motion to Dismiss Plaintiffs' Amended Complaint Under Fed. R. Civ. P. 12(B)(6)" filed Sep. 26, 2016 (19 pages).
Case 2:16-cv-00781-MMD-CWH, Document 59, "Order" filed Sep. 27, 2016 (3 pages).
Case 2:16-cv-00781-RCJ-VCF, Document 64, "Plaintiffs" Motion to Lift Stay filed Nov. 23, 2016 (6 pages).
Case 2:16-cv-00781-RCJ-VCF, Document 69, "Order" filed Dec. 12, 2016 (11 pages).
Case 2:16-cv-00781-RCJ-VCF, Document 72, "DraftKings' Answer to Plaintiffs' First Amended Complaint and Affirmative Defenses" filed Dec. 27, 2016 (29 pages).
Case 2:16-cv-00801-JCM-VCF, Document 1, "Plaintiffs' Complaint for Patent Infringement" filed Apr. 8, 2016 (31 pages).
Case 2:16-cv-00801-RCJ-VCF, Document 31, "Plaintiffs' First Amended Complaint for Patent Infringement" filed Jun. 13, 2016 (48 pages).
Case 2:16-cv-00801-RCJ-VCF, Document 32, "Index of Exhibits to Plaintiffs' First Amended Complaint for Patent Infringement" filed Jun. 13, 2016 (3 pages).
Case 2:16-cv-00801-RCJ-VCF Document 44, "Defendant Fanduel, Inc's Motion to Dismiss for Failure to State a Claim Upon Which Relief Can be Granted" filed Jul. 14, 2016 (18 pages).

(56) References Cited

OTHER PUBLICATIONS

Case 2:16-cv-00801-RCJ-VCF Document 75, "Defendant Fanduel, Inc's Motion for Leave to Supplement Briefing Under LR 7-2(g)" filed Sep. 22, 2016 (3 pages).
Case 2:16-cv-00801-RCJ-VCF Document 77, "Plaintiffs' Opposition to Defendant Fanduel, Inc.'s Motion for Leave [ECF No. 75]" filed Oct. 11, 2016 (4 pages).
Case 2:16-cv-00801-RCJ-VCF Document 81, "Defendant Fanduel Inc.'s Notice of Withdrawal of Motion Seeking Leave to File Supplemental Briefing" filed Oct. 20, 2016 (3 pages).
Case 2:16-cv-00801-RCJ-VCF Document 86, "Plaintiffs' Second Amended Complaint for Patent Infringement" filed Nov. 16, 2016 (70 pages).
Case 2:16-cv-00801-RCJ-VCF Document 87, "Defendant Fanduel's Answer to Plaintiffs' Second Amended Complaint and Affirmative Defenses" filed Nov. 30, 2016 (19 pages).
Case 2:16-cv-00801-RCJ-VCF Document 88, "Defendant's Partial Motion to Dismiss CGT's Second Amended Complaint for Failure to State a Claim Upon Which Relief Can Be Granted" filed Nov. 30, 2016 (14 pages).
Case 2:16-cv-00801-RCJ-VCF Document 94, "Plaintiffs' Opposition to Fanduel, Inc.'s Partial Motion to Dismiss" filed Dec. 19, 2016 (11 pages).
Case 2:16-cv-00801-RCJ-VCF Document 103, "Fanduel, Inc.'s Reply in Support of Partial Motion to Dismiss" filed Dec. 27, 2016 (7 pages).
Case 2:16-cv-00801-RCJ-VCF Document 113, "Order" filed Jan. 4, 2017 (11 pages).
Case 2: 16-cv-801-RCJ-VCF Document 114, "Transcript of Pretrial Conference" filed Dec. 2, 2016 (54 pages).
Petitioners' Reply to Patent Owner's Response for IPR2017-01333, U.S. Pat. No. 9,306,952 dated May 1, 2018.
Patent Owner's Submission Regarding Petitioner's Waived Challenges for IPR2017-01333, U.S. Pat. No. 9,306,952, filed May 22, 2018.
Patent Owner's Response for IPR2017-01333, U.S. Pat. No. 9,306,952, filed Jan. 29, 2018.
Patent Owner's Submission Regarding Petitioner's Waived Challenges for IPR2017-01532, U.S. Pat. No. 9,355,518, filed May 22, 2018.
Patent Owner's Response for IPR2017-01532, U.S. Pat. No. 9,355,518, filed Mar. 9, 2018.
Deposition of Garry Kitchen for IPR2017-01333, U.S. Pat. No. 9,306,952 dated Jan. 17, 2018.
Deposition of Dr. Robert Akl for IPR2017-01532, U.S. Pat. No. 9,355,518 dated Mar. 9, 2018.
Glossary of probability and statistics, Wikipedia, dated Mar. 5, 2018.
Van Nostrand's Scientific Encyclopedia, 3$^{rd}$ Edition, published Jan. 1958.
Solutions for Restaurants, Hotels & Resorts and Clubs—Guest bridge, Inc. (online). Guestbridge, Inc. Feb. 6, 2007 [retrieved on Aug. 21, 2008]. Retrieved from the Internet: <URL: http://web.archive.org/web/20070206134139/www.guestbridge.com/solutions.html, entire document especially p. 1.
Notification of Transmittal of the International Search Report and the Written Opinion of the International Searching Authority, or the Declaration for International Application No. PCT/US08/56120, 14 pages, dated Aug. 29, 2008.
Australian Patent Office Written Opinion and Search Report for Application No. SG 200605830-9; 11 pages; dated Nov. 29, 2007.
Notification of Transmittal of the International Search Report and the Written Opinion of the International Searching Authority for International Application No. PCT/US06/26348; 9 pages; dated Dec. 28, 2007.
Janna Lindsjö, et al.; *GIGANT—an Interactive, Social, Physical and Mobile Game*; PDC 2002 Proceedings of the Participatory Design Conference; Malmö, Sweden; 5 pages; Jun. 23-25, 2002.

Notification of Transmittal of the International Search Report and the Written Opinion of the International Searching Authority for International Application PCT/US06/26599; 7 pages; dated Sep. 24, 2007.
Notification of Transmittal of the International Search Report and the Written Opinion of the International Searching Authority for International Application PCT/US06/06315; 10 pages; dated Sep. 24, 2007.
Stephan Neuert, et al.; The British Library; *Delivering Seamless Mobile Services Over Bluetooth*; 11 pages; date unknown.
Business Wire; *Home Gambling Network Inc., With U.S. Pat. No. 5,800,268—Business/Gambling—HGN and UUNET, a WorldCom/MCI Company, Reach a Mutually Satisfactory Resolution in Patent Suit*; 2 pages; Mar. 19, 1999.
Business Wire; *GoldPocket Interactive Launches EM Mobile Matrix, Industry's First Fully Synchronous Interactive Television and Massively Multi-Player Gaming Solution*; 2 pages; Mar. 17, 2003.
Brand Strategy; *The National Lottery has announced that UK consumers will be able to purchase tickets using the internet, TV and Mobile phones*. (Launches & Rebrands); ISSN 0965-9390; 1 page; Apr. 2003.
PR Newswire; *Ideaworks3D appointed by Eidos Interactive to Develop Blockbuster Line-up for Nokia N-Gage Mobile Game Deck*; 2 pages; May 23, 2003.
Telecomworldwire; *New mobile lottery service launched by mLotto*; 1 page; Oct. 30, 2003.
Singh, et al.; *Anywhere, Any-Device Gaming*; Human Interface Technology Laboratory; National University of Singapore; 4 pages; 2004.
Wu, et al; The Electronic Library; *Real Tournament—Mobile Context-Aware Gaming for the Next Generation*; vol. 22; No. 1; ISBN 0-86176-934-1; ISSN 0264-0473; 11 pages; 2004.
*Precision Marketing*; vol. 16, No. 11; ISSN 0955-0836; 2 pages; Jan. 9, 2004.
Online Reporter; *GTECH Takes Lottery Mobile*; 1 page; Feb. 28, 2004.
Personal and Ubiquitous Computing; *Human Pacman: a mobile, wide-area entertainment system based on physical, social, and ubiquitous computing*; 12 pages; May 2004.
PR Newswire; *M7 Networks Partners With Terraplay to Deliver Real-Time Multiplayer Gaming Functionality to Its Community Services Offerings*; 2 pages; Jun. 1, 2004.
China Telecom; *Win Win Gaming Inc. announces agreement to provide wireless lottery and entertainment content in Shanghai*; vol. 11, No. 9; 2 pages; Sep. 2004.
Business Wire; *EA Announces Next Step Into Mobile Gaming; Digital Bridges Named as Strategic Partner for Distribution of Mobile Interactive Entertainment in Europe, North and South America*; 3 pages; Sep. 2, 2004.
Wireless News; *Mobile Casinos, Lotteries Good News for Mobile Revenues*; 2 pages; Feb. 23, 2005.
Business Wire; *MobileGamingNow, Inc. Announces the Launch of the First Ever Mobile Phone Interactive, Multi-Player Gaming System for Poker*; 2 pages; Apr. 4, 2005.
Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages; Apr. 21, 2005.
Business Wire; *July Systems' Play2Win Interactive Game Service Launched on UK's MobileGaming.com; Speedy Customer Deployments Now Possible With July's New UK Mobile Retailing Infrastructure*; 2 pages; May 4, 2005.
Gaming Labs Certified™; Standard Series; *GLI-26: Wireless Gaming System Standards*; Version: 1.1; 28 pages; Jan. 18, 2007.
Notification of Transmittal of the International Search Report and the Written Opinion of the International Searching Authority, or the Declaration, for International Application No. PCT/US06/26343, 8 pages, dated Jan. 19, 2007.
Notification of Transmittal of the International Search Report and the Written Opinion of the International Searching Authority, or the Declaration, for International Application No. PCT/US06/26600, 8 pages, dated Jan. 19, 2007.

(56) References Cited

OTHER PUBLICATIONS

Notification of Transmittal of the International Search Report and the Written Opinion of the International Searching Authority, or the Declaration for International Application No. PCT/US06/26346, 8 pages, dated Mar. 29, 2007.
Notification of Transmittal of the International Search Report and the Written Opinion of the International Searching Authority, or the Declaration for International Application No. PCT/US05/05905, 10 pages, dated Apr. 10, 2007.
Gaming Labs Certified™; Standard Series; *GLI-11: Gaming Devices in Casinos*; Version: 2.0; 96 pages; Apr. 20, 2007.
Notification of Transmittal of the International Search Report and the Written Opinion of the International Searching Authority, or the Declaration for International Application No. PCT/US06/26350, 8 pages, dated Apr. 27, 2007.
Gaming Labs Certified™; Standard Series; *GLI-21: Client-Server Systems*; Version: 2.1; 85 pages; May 18, 2007.
Australian Patent Office; Examination Report for Singapore Patent Application No. 0605830-9; 5 pages; dated Jul. 7, 2008.
PCT Notification of Transmittal of the International Search Report and the Written Opinion of the International Searching Authority for International Application No. PCT/US07/66873; 4 pages; dated Aug. 4, 2008.
PCT Notification of Transmittal of the International Search Report and the Written Opinion of the International Searching Authority for International Application No. PCT/US2008/057239; 8 pages; dated Aug. 7, 2008.
Australian Examination Report for AU Application 2006269418; 2 pages; dated Mar. 12, 2009.
EPO Examination Report for EP Application No. 05775503.5-1238 dated Jul. 23, 2007; 5; 5 pages.
PCT International Search Report and Written Opinion for International Application No. PCT/US2005/025722; 051102; 11 pages.
Canadian Examination Report for CA Application No. 2613338; 4 pages; dated Oct. 5, 2009.
International Search Report for International Application No. PCT/US07/84669; 2 pages; dated Jun. 6, 2008.
Office Action for Japanese Patent Application No. 2007-500972; dated Feb. 23, 2010; 3 pages; with translation 3 pages.
Office Action for Japanese Patent Application No. 2007-556420; dated Feb. 23, 2010; 4 pages; with translation 4 pages.
AU Examination Report for AU Application No. 2006269413; 2 pages; dated Apr. 29, 2009.
Notice of Acceptance for AU Application No. 2006269420 ; 16 pages; dated May 3, 2010.
AU Examination Report for AU Application No. 2006269413; 2 pages; dated Sep. 7, 2009.
Canadian Examination Report for CA Application No. 2613335; 4 pages; dated Mar. 29, 2010.
Office Action for Japanese Patent Application No. 2008-520419 ; dated Feb. 2, 2010; 8 pages; with translation 8 pages.
AU Examination Report for AU Application No. 2008239516; 3 pages; dated May 14, 2010.
AU Examination Report for AU Application No. 2008201005; 3 pages; dated Aug. 11, 2009.
AU Examination Report for AU Application No. 2007216729; 5 pages; dated Jan. 16, 2009.
AU Examination Report for AU Application No. 2007319235; dated Jul. 6, 2010; 2 pages.
AU Examination Report for AU Application No. 2006269418; 2 pages; dated Oct. 27, 2009.
AU Examination Report for AU Application No. 2006269416; 4 pages; dated Jun. 10, 2009.
AU Examination Report for AU Application No. 2006216723; 2 pages; dated Jul. 1, 2010.
CA Examination Report for CA Application No. 2612896; dated Aug. 30, 2010; 4 pages.
CA Examination Report for CA Application No. 2613333; dated Aug. 30, 2010; 4 pages.
NZ Examination Report for NZ Application No. 577177; dated Dec. 17, 2010; 2 pages.
AU Examination Report for AU Application No. 2008201005; dated Dec. 17, 2010; 4 pages.
CA Examination report for CA Application No. 2596474; dated Nov. 15, 2010; 6 pages.
UK Office Action for Application No. 0910202.1 dated Dec. 21, 2010; 7 pages.
AU Examiners Report for Application No. 2005216239 dated Jan. 5, 2011; 2 pages.
JP Office Action for Application No. 2008-520419; dated Feb. 15, 2011; 8 pages total with English Translation.
Examination Report for AU Application No. 2010212278 dated Feb. 15, 2011; 1 page.
JP Office Action for Application No. 2008-520393; dated Jan. 24, 2011; 8 pages total with English Translation.
Notice of Acceptance for AU Application No. 2006269416 dated Mar. 9, 2011; 3 pages.
Chinese Office Action for Application No. 200580009075.5 dated Oct. 26, 2010; 7 pages.
Chinese Office Action for Application No. 200580009075.5 dated Sep. 25, 2009; 10 pages.
Notice of Acceptance for CA Application No. 2613335 dated Apr. 4, 2011; 1 pages.
JP Office Action for Application No. 2008-520391; dated Feb. 1, 2011; 7 pages total with English Translation.
Notice of Acceptance for AU Application No. 2006269413 dated Feb. 7, 2011; 3 pages.
JP Office Action for Application No. 2008-520389; dated Jan. 18, 2011; 6 pages total with English Translation.
Notice of Acceptance for AU Application No. 2006269418 dated Apr. 8, 2010; 3 pages.
JP Office Action for Application No. 2008-520420; dated Aug. 17, 2010; 11 pages total with English Translation.
JP Office Action for Application No. 2008-520395; dated Feb. 1, 2011; 4 pages total with English Translation.
AU Examination Report for Application No. 2010214792 dated May 18, 2011; 2 pages.
EP Office Action for Application No. 07760844.6 dated Jan. 5, 2009; 7 pages.
Notice of Acceptance for Application No. 2010214792 dated Aug. 3, 2011; 3 pages.
Examiners second Report for AU Application No. 2010212329; 2 pages; dated Aug. 16, 2011
Examination Report for AU Application No. 2010212329; 2 pages; dated May 6, 2011.
Examination Report for AU Application No. 2010202517; 2 pages; dated Jun. 23, 2011.
AU Examination Report for AU Application No 2008201005; 4 pages; dated Mar. 21, 2011.
GB Office Action for Application No. GB0910202.1; 4 pages; dated Jul. 11, 2011.
Notice of Allowance for CA Application No. 2613333; 1 pages; dated Jul. 20, 2011.
Notice of Acceptance for AU Application No. 2006269268 dated Jun. 2, 2011; 3 pages.
JP Office Action for Application No. 2008-520393; dated Aug. 16, 2011; 16 pages total with English Translation.
Chinese Office Action for Application No. 200580009075.5; dated Aug. 3, 2011; 8 pages.
Notice of Acceptance of AU Application No. 20100212329; 3 pages; dated Jul. 27, 2011.
Canadian Examination Report for CA Application No. 2613338; 4 pages; dated Aug. 16, 2011.
AU Examination Report for Application No. 2011202267; 2 pages; dated Nov. 30, 2011.
AU Examination Report for Application No. 2011224094; 5 pages; dated Nov. 25, 2011.
EP Office Action for Application No. 06786672.3 dated Nov. 22, 2011; 7 pages.
EP Office Action for Application No. 06774541.4 dated Nov. 22, 2011; 6 pages.

(56) References Cited

OTHER PUBLICATIONS

Examination Report for CA Application No. 2557209 dated Jan. 20, 2012; 6 pages.
Examination Report for CA Application No. 2598041 dated Jan. 27, 2012; 6 pages.
AU Examination report for Application No. 2011203051; dated May 28, 2012; 4 pages.
Canadian Office Action for CA Application No. 2613084; dated Feb. 16, 2012; 3 pages.
Extended EP Search report for Application No. 07871467.2; dated Feb. 8, 2012; 8 pages.
JP Office Action for Application No. 2008-520389; dated Jan. 24, 2012; 5 pages (includes English Translation).
AU Examination Report for AU Application No. 2007319235; dated Mar. 13, 2012; 2 pages.
JP Office Action for Application No. 2007-500972; dated Jan. 24, 2012; 4 pages (includes English Translation).
AU Examination Report for AU Application No. 2008201005; dated Mar. 21, 2012; 4 pages.
JP Office Action for Application No. 2008-520391; dated Apr. 10, 2012; 6 pages total with English Translation.
Notice of Acceptance for AU Application No. 2011202267; 3 pages; dated Mar. 6, 2012.
AU Examination report for Application No. 2011244922; dated Jun. 12, 2012; 2 pages.
CA Examination Report for Application No. 2754756; 6 pages; dated May 29, 2012.
EP Office Action for Application No. 06786486.8; 5 pages; dated May 14, 2012.
EP Office Action for Application No. 06786483.5; 7 pages; dated May 14, 2012.
AU Examination Report for Application No. 2011235990; 2 pages; dated May 23, 2012.
JP Office Action for Application No. 2008-520395; dated Apr. 10, 2012; 4 pages (includes English Translation).
AU Examination Report for Application No. 2011202178; dated May 28, 2012; 2 pages.
JP Office Action for Application No. 2011-12803; dated Jun. 12, 2012; 36 pages total with English Translation.
NZ Examination Report for NZ Application No. 577177; dated Jun. 29, 2012; 2 pages.
JP Office Action for Application No. 2008-520393; dated Jul. 3, 2012; 4 pages total with English Translation.
AU Examination Report for Application No. 2011244922; 2 pages; dated Jun. 12, 2012.
AU Examiners Report for Application No. 2005216239 dated Nov. 18, 2009; 2 pages.
Chinese Office Action for Application No. 200580009075.5; dated Jun. 5, 2012; 9 pages.
European Extended Search Report for Application No. 05723674.7; dated Dec. 7, 2011; 6 pages.
AU Notice of Acceptance for AU Application No. 2006216723; 3 pages; dated Mar. 20, 2012.
European Extended Search Report for Application No. 06735821.8; dated Dec. 7, 2011; 9 pages.
Office Action for Japanese Patent Application No. 2010-186542 ; dated May 22, 2012; 6 pages.
Examination Report for AU Application No. 2010202517; 2 pages; dated Aug. 16, 2011.
European Extended Search Report for Application No. 06786488.4; dated May 14, 2012; 6 pages.
JP Decision of Refusal for Application No. 2008-520393; dated Jul. 3, 2012; 4 pages.
Notice of Acceptance for AU Application No. 2010212278 dated Nov. 20, 2012; 3 pages.
Extended EP Search report for Application No. 06774581.0; dated Nov. 22, 2011; 7 pages.
JP Office Action for Application No. 2008-520419; dated Jun. 12, 2012; 36 pages total with English Translation.
CA Examination report for CA Application No. 2596474; dated Mar. 20, 2012; 1 page.
AU Examination Report for AU Application No. 2007319235; dated Apr. 16, 2012; 2 pages.
Yampolskiy et al., 2006, "Use of Behavioral Biometrics in Intruction detection and Online Gaming", Biometric technology for Human Identification III, edited by Patrick J. Flynn, Sharath Pankanti, Proc. of SPIE vol. 6202, 62020U-1-10.
NZ Examination Report for NZ Application No. 577177; dated Oct. 12, 2012; 2 pages.
NZ Examination Report and Notice of Acceptance for NZ Application No. 577177; dated Nov. 6, 2012; 2 pages.
NZ Examination Report for NZ Application No. 600525; dated Jun. 14, 2012; 2 pages.
AU Examination Report for Application No. 2011202178; dated Sep. 4, 2012; 3 pages.
Office Action for Japanese Patent Application No. 2010-186542 ; dated Jan. 8, 2013; 5 pages.
European Extended Search Report for Application No. 05723674.7; dated Sep. 12, 2012; 5 pages.
AU Examination Report for Application No. 2011235990; 3 pages; dated Aug. 2, 2012.
AU Notice of Acceptance for AU Application No. 2010202517; 2 pages; dated Mar. 18, 2013.
CN Notice of Reexamination for Application No. 200580009075.5; 6 pages; dated May 24, 2013 (w/ English translation).
European Extended Search Report for Application No. 06735821.8; dated Jan. 17, 2013; 5 pages.
Australian Examination Report for AU Application No. 2012203722, 2 pages; dated Aug. 23, 2013.
JP Final Decision for Appeal No. 2012-9549; dated Sep. 10, 2013; 26 Pages (w/English translation).
JP Decision on Appeal for Application No. 2005-520393; dated Sep. 10, 2013; 45 pages (w/English translation).
CN Reexamination Decision for Application No. 200580009075.5; dated Dec. 5, 2013; 7 pages (w/English translation).
"Probability, Odds, and Random Chance", Problem Gambling Institute of Ontario, retrieved from Internet on Jan. 27, 2014 <http://www.problemgambling.ca/en/resourcesforprofessionals/pages/probabilityoddsandrandomchance.aspx>.
"Changing Probability to Odds", Math Magic, retrieved from Internet on Jan. 27, 2014 <http://www.mathmagic.com/probability/prob_to_odds.htm>.
"Craps From Wikipedia, the free encyclopedia", Wikipedia, retrieved from Internet on Jan. 27, 2014 <http://en.wikipedia.org/wikiICraps#8et_odds_and_summary>.
JP Office Action for App. No. 2012-117867; 5 pages; dated Jan. 7, 2014 (w/English translation).
EP Office Action for Application No. 06786488.4; dated Jan. 27, 2014; 7 pages.
Bahl and Padmanabhan, 2000, "RADAR: An In-Building RF-based User Location and Tracking System", Microsoft Research, p. 775-784.
CN Office Action for App. No. 200580009075.5; dated Mar. 26, 2014; 6 pages.
JP Office Action for App. No. 2012-208520; dated Mar. 18, 2014; 6 pages (w/English translation).
CA Examiner's Requisition for Application No. 2,557,209; dated Jun. 25, 2014; 2 pages.
CA Examiner's Requisition for App. No. 2,598,041; dated Jul. 17, 2014; 2 pages.
CN Office Action for App. No. 200580009075.5; dated Nov. 15, 2014; 5 pages.
AU Examination Report No. 1 for App. No. 2013201174; dated Feb. 4, 2015; 5 pages.
CA Examiners Requisition for App. No. 2,557,209; dated Mar. 31, 2015; 4 pages.
CN Office Action for App No. 200580009075.5; dated May 14, 2015; 4 pages (w/English translation).
JP Office Action for App. No. 2012-117867; dated Apr. 21, 2015; 6 pages (w/English translation).
JP Final Decision for App. No. 2012-208520; dated Apr. 21, 2015; 9 pages (w/English translation).

(56) References Cited

OTHER PUBLICATIONS

EP Summons to Attend Oral Hearings for App. No. 08723674.7; Jul. 10, 2015; 6 pages.
CA Examiner's Requisition for App. No. 2,598,041; dated Jul. 28, 2015; 4 pages.
JP Office Action for Application No. 2014-100471 dated Aug. 18, 2015; 6 pages.
AU Patent Examination Report No. 1 for App. No. 2014201396; dated Sep. 15, 2015; 3 pages.
CA Examiner's Report for App. No. 2,612,896; dated Sep. 16, 2015; 4 pages.
JP Office Action for App. No. 2014-161395; dated Aug. 25, 2015; 6 pages (w/English translation).
Extended EP Search Report for App. No. 11817104.0; dated Sep. 25, 2015; 9 pages.
Personal authentication through biometric technologies, Podio et al, IEEE 2002.
Digital Chips for an online casino, Castell'a-Roca et al, IEEE 2005.
CA Examiner's Report for App. No. 2,623,038; dated Jan. 4, 2016; 6 pages.
AU Patent Examination Report No. 2 for App. No. 2011289295; dated Jan. 6, 2016; 3 pages.
European Communication for Application No. 05723674.7; dated Sep. 12, 2012; 5 pages.
AU Patent Examination Report No. for App. No. 2015200884; dated Mar. 15, 2016; 4 pages.
CA Notice of Allowance for App. No. 2,669,836; dated Apr. 6, 2016; 1 page.
AU Notice of Acceptance for App. No. 2011289295; 3 pages.
AU Examination Report No. 1 for Application No. 2012201974; dated Oct. 21, 2013; 3 pages.
AU Notice of Acceptance for Application No. 2012201974; dated Apr. 2, 2015; 2 pages.
AU 1st examination report for AU Application No. 2015203832; dated May 5, 2016; 5 pages.
AU Examination Report for Application No. 2015203832; dated Apr. 27, 2017; 4 pages.
AU First Exam Report for Application No. 2017202909 dated Feb. 20, 2018, 3 pages.
CA Examiners Report for App. No. 2,669,836; dated Nov. 22, 2011; 6 pages.
CA Examiners Report for App. No. 2,669,836; dated Feb. 24, 2014; 2 pages.
CA Examiner's Requisition for App. No. 2,669,836; dated Mar. 13, 2015; 4 pages.
CA Exam Report for Application No. 2928614 dated Aug. 30, 2017.
CA Exam Report for Application No. 2,928,614 dated Jul. 17, 2018; 8 pages.
JP Office Action for Application No. 2009-537329 dated Feb. 26, 2013; 13 pages.
NZ Examination Report for App. No. 618654; dated Dec. 20, 2013; 2 pages.
EP Decision to Refuse a European Patent for App. No. 07871467.2; dated Mar. 3, 2014; 20 pages.
JP Office Action for App. No. 2014-100471; dated Apr. 12, 2016; 4 pages (w/English translation).
JP Office Action for Application No. 2017-075936; dated May 1, 2018; 6 pages (w/English Translations).
Roman V. Yampolsky & Venu Govindarayu, "Use of Behavorial Biometrics in Intrusion Dection and Online Gaming", Proc. of SPIE vol. 6202, Apr. 17, 2006, pp. 62020U-1-62020U-10.
NZ Examination Report for App. No. 618654; dated Apr. 9, 2015; 2 pages.
NZ Examination Report for App. No. 706217; dated Apr. 9, 2015; 2 page.
NZ Notice of Acceptance for App. No. 706217; dated Jan. 21, 2016; 1 page.
EP Search Report for App. No. 07871467.2; dated Feb. 22, 2013; 8 pages.
AU Notice of Acceptance for Application No. 2011203051 dated Aug. 28, 2012, 3 pages.
AU Exam Report for Application No. 2012258503 dated Feb. 24, 2014, 3 pages.
AU Exam Report for Application No. 2015258347 dated Nov. 11, 2016, 3 pages.
CA Examiners Report for App. No. 2,754,756 dated Dec. 8, 2015; 6 pages.
CA Examiners Report for App. No. 2,754,756 dated Dec. 30, 2013; 3 pages.
CA Examiners Report for App. No. 2,754,756 dated Sep. 3, 2014; 3 pages.
CA Examiners Report for App. No. 2,754,756 dated May 12, 2015; 6 pages.
CA Examiners Report for App. No. 2,754,756 dated Apr. 26, 2017; 10 pages.
CA Examiners Report for App. No. 2,754,756 dated May 24, 2018; 11 pages.
"An experimental comparison of secret-based user authentication technologies", Irakdeous et al.—Information Management & Computer Security, 2002, 1, 2/3 ABI/INFORM Global, pp. 100-108.
EP Search report for Application No. 067864868 dated Jan. 16, 2014; 5 pages.
EP Summons to Attend Oral Hearings for Application No. 067864868 dated Jun. 7, 2017; 5 pages.
JP Office Action for App. No. 2008-520391 dated Jun. 12, 2013; 4 pages (w/English translation).
JP Office Action for App. No. 2012-225097 dated Mar. 25, 2014; 12 pages (w/English translation).
JP Office Action for App. No. 2012-225097 dated Jul. 7, 2015; 11 pages (w/English translation).
JP Notice of Allowance for App. No. 2012-225097 dated Jul. 7, 2015; 4 pages (w/English translation).
Front Mission Online playing manual 2005, SQUARE ENIX, accepted by the Japanese Patent Office dated May 13, 2005, p. 017.
Final Fantasy XI phantom of JIRART for Windows playing manual 2005, SQUARE ENIX, accepted by the Japan Patent Office dated Mar. 31, 2005, p. 029.
JP Office Action for App. No. 2015-218973 dated Dec. 6, 2016; 13 pages (w/English translation).
JP Office Action for App. No. 2015-218973 dated Nov. 28, 2017; 10 pages (w/English translation).
JP Decsion of Refusal for App. No. 2015-218973 dated Jun. 19, 2018; 4 pages (w/English translation).
JP Reconsideration Report for App. No. 2015-218973 dated Nov. 5, 2018; 6 pages (w/English translation).
EP Examination Report for App. No. 067864835; dated Jan. 16, 2014; 5 pages.
JP Office Action for Application No. 2008-520389; dated Apr. 9, 2013; 5 pages (includes English Translation)
JP Office Action for Application No. 2013-165976; dated Sep. 9, 2014; 5 pages.
JP Final Decision for App. No. 2013-165976; dated Jun. 30, 2015; 6 pages (w/English translation).
JP Office Action for Application No. 2013-165976; dated May 16, 2017; 14 pages.
JP Office Action for App. No. 2015-214615; dated Dec. 13, 2016; 13 pages (w/English translation).
JP Final Decision for Application No. 2015-214615; dated Aug. 29, 2017; 11 pages (w/English Translations).
JP Office Action for App. No. 2017-207806; dated Sep. 25, 2018; 4 pages w/English Translations.
AU First Examination Report for Application No. 2016253623; dated Dec. 4, 2017; 5 pages.
Examination Report for AU Application No. 2006269420 ; 2 pages; dated May 27, 2009.
AU Examination Report for App. No. 2014200947; dated Aug. 14, 2014; 2 pages.
AU examination report for Application No. 2015213331; dated Aug. 18, 2016; 5 pages.
AU Notice of Acceptance for Application No. 2015213331; dated Jun. 22, 2017; 3 pages.

(56) References Cited

OTHER PUBLICATIONS

AU First Exam Report for Application No. 2017203279 dated May 22, 2018, 6 pages.
Canadian Examination Report for CA Application No. 2613362; 4 pages; dated Oct. 13, 2009.
CA Examiner's Requisition for Application No. 2,613,362; dated Sep. 16, 2013; 3 pages.
CA Examiner's Report for App. No. 2613362; dated Apr. 1, 2015; 4 pages.
CA Examiner's Report for App. No. 2613362; dated May 3, 2016; 6 pages.
CA Examiners Report for Application No. 2613362; dated Jun. 15, 2017; 4 pages.
CA Exam Report for Application No. 2613362 dated May 18, 2018, dated May 18, 2018; 4 pages.
CA Exam Report for Application No. 2,988,194 dated Sep. 27, 2018; 4 pages.
CA Exam Report for Application No. 2,988,189 dated Sep. 27, 2018; 4 pages.
CA Exam Report for Application No. 2,988,180 dated Sep. 27, 2018; 4 pages.
EP Office Action for Application No. 06774541.4 dated Feb. 15, 2013; 5 pages.
EP Summons to Attend Oral Hearings for App. No. 06774541.4; Aug. 1, 2014; 6 pages.
EP Preliminary Opinion of the Examining Division for EP App. No. 06774541.4; 4 pages; dated Nov. 10, 2014.
EP Decision to Refuse a European Patent for App. No. 06774541.4; dated Jan. 26, 2015; 15 pages.
JP Office Action for Application No. 2008-520395; dated Jun. 22, 2013; 8 pages.
JP Office Action for App. No. 2012-225339; dated Mar. 25, 2014; 5 pages (w/English translation).
JP Office Action for App. No. 2012-225339; dated Jun. 30, 2015; 9 pages (w/English translation).
PCT International Search Report and Written Opinion for International Application No. PCT/US2011/047587877; 13 pages; dated Jan. 13, 2012.
AU Examination Report for App. No. 2011289295; dated May 1, 2014; 5 pages.
AU Exam Report for Application No. 2016202914 dated Apr. 10, 2017, 3 pages.
AU Notice of Acceptance for Application No. 2016202914 dated Aug. 1, 2017, 3 pages.
AU First Examiners Report for Application No. 2017258830 dated Nov. 20, 2018, 3 pages.
Canadian Examination Report for Application No. 2,808,315 dated Mar. 1, 2017, 4 pages.
Canadian Notice of Allowance for Application No. 2,808,315 dated Jan. 10, 2018, 1 page.
European Office Action for Application No. 11817104.0 dated Oct. 20, 2016, 8 pages.
European Summons to Attend Oral Hearings for Application No. 11817104.0 dated Feb. 23, 2018, 14 pages.

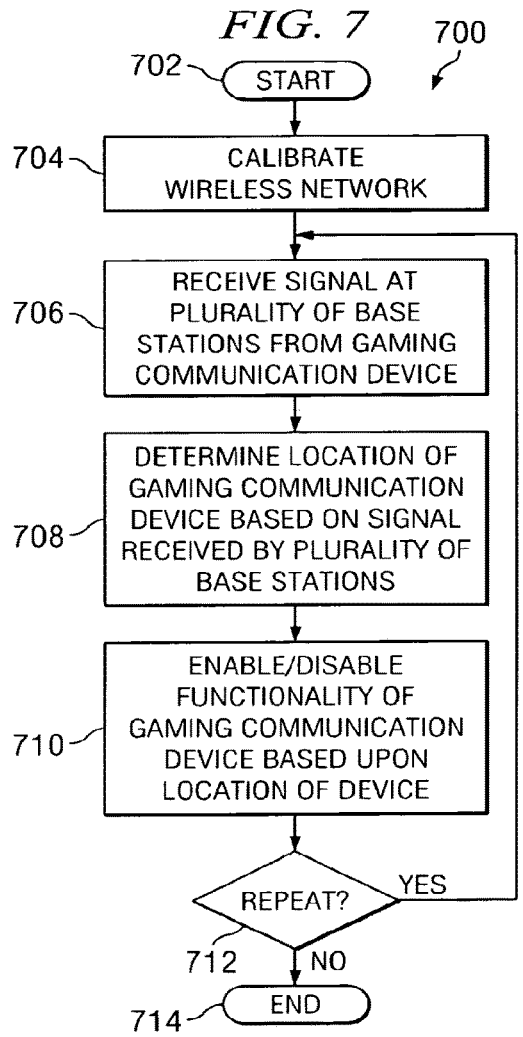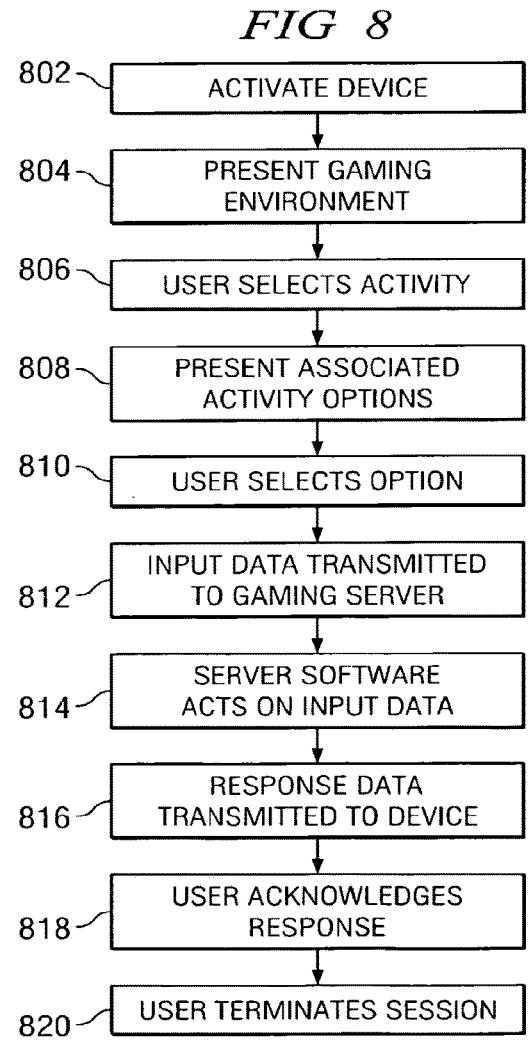

SYSTEM AND METHOD FOR WIRELESS GAMING WITH LOCATION DETERMINATION

CROSS-REFERENCES TO RELATED APPLICATIONS

This application is a continuation of Ser. No. 15/250,500, filed on Aug. 29, 2016, which is a continuation of Ser. No. 13/612,301, filed on Sep. 12, 2012 (now U.S. Pat. No. 9,430,901), which is a continuation of U.S. application Ser. No. 12/197,809, filed on Aug. 25, 2008 (now U.S. Pat. No. 8,504,617 issued on Aug. 6, 2013), which is a continuation of U.S. application Ser. No. 11/201,812, filed on Aug. 10, 2005 (now abandoned). U.S. patent application Ser. No. 12/197,809 filed Aug. 25, 2008 claims priority to U.S. Provisional Application Ser. No. 60/697,861 filed Jul. 8, 2005 and is a continuation of U.S. application Ser. No. 11/063,311 filed on Feb. 21, 2005 (now U.S. Pat. No. 8,816,967 issued Dec. 31, 2013) and is a continuation-in-part of U.S. application Ser. No. 10/835,995 filed on Apr. 29, 2004 (now U.S. Pat. No. 8,092,303 issued on Jan. 10, 2012), which claims priority to U.S. Provisional Application Ser. No. 60/547,507 filed on Feb. 25, 2004 and U.S. Provisional Application Ser. No. 60/549,187 filed on Mar. 1, 2004. All of the above are hereby incorporated herein by reference.

TECHNICAL FIELD

The present invention relates generally to the field of gaming and, more particularly to a system and method for wireless gaming with location determination.

BACKGROUND

The gaming industry allows people to participate ill a variety of gaming activities within the limits of state and federal law. Possible gaming activities include gambling, such as that provided by casinos. Casino-type gambling activities include, but are not limited to, slot machines, table games, poker, keno, and other gaming activities that allow for the placement of bets. Events also may be wagered on and may include, for example, sporting events, such as horse or auto racing, and athletic competitions such as football, basketball, baseball, boxing, and golf. Gaming can also include non-wagering games and events, such as lottery contests. In a casino environment, the participation in such gaming activities is generally limited by a participant's physical location. For example, participants in casino-type gambling activities must be present at a gaming machine or at a gaming table within the casino in order to place a bet. Similarly, people interested in wagering on sporting events or athletic competitions in a casino environment must place bets through a sports book that is located in the casino.

SUMMARY

In accordance with the teachings of the present invention, a system and method for wireless gaming with location determination are provided. In a particular embodiment of the present invention, the system includes a gaming server; a wireless network at least partially covering a property, the wireless network comprising a plurality of signal detection devices; and a gaming communication device operable to transmit and receive gaming information to and from the gaming server via the wireless network. A location of the gaming communication device on the property may be determined based upon a signal received by the plurality of signal detection devices from the gaming communication device. Based upon the location of the gaming communication device on the property, a predetermined functionality of the gaming communication device may be enabled. In another embodiment, the method for wireless gaming with location determination includes providing a wireless network comprising a plurality of signal detection devices, the wireless network at least partially covering the property; receiving at the plurality of signal detection devices a signal from at least one wireless communication device; determining a location of the at least one wireless communication device based upon the signal received by the plurality of signal detection devices; and enabling a predetermined functionality of the wireless communication device based upon the location of the wireless communication device. A technical advantage of particular embodiments of the present invention may includes the ability to enable or disable different functionalities of a wireless communication device based upon the location of the device on a property. For example, the gambling functionality of the device may be disabled when the device is 25 located in a hotel room at a casino, but enabled when the device is located in other parts of the casino.

Another technical advantage of particular embodiments of the present invention may include the ability to communicate different information to the user of the wireless communication device based upon the location of the device on a property. For example, a user may be sent a message tailored to the user's location on property, such as information about events occurring elsewhere on the property and directions to those events.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages, reference is now made to the following description, taken in conjunction with the accompanying drawings, in which:

FIG. 7 illustrates a flowchart illustrating a method for wireless gaming having location determination in accordance with an embodiment of the present invention;

FIG. 8 is a flowchart depicting steps in a gaming method according to an embodiment of the present invention;

DETAILED DESCRIPTION OF EMBODIMENTS OF THE INVENTION

A distributed gaming system enables participants to engage in gaming activities from remote and/or mobile locations. The possible gaming activities include gambling, such as that provided by casinos. Gambling activities may include 5 any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include WiFi and WiMax networks. In one embodiment, the gaming system communications network is entirely independent of the Internet. In another embodiment, the gaming system operation makes minimal use of the Internet, such that only information for which there is no security issues is transmitted via the Internet and/or information may be encrypted. Preferably, the communications network enables players to participate in gaming from remote locations (e.g., outside of the gaming area of a casino). Also, the system may enable players to be mobile during participation in the gaming activities. Preferably, the system has a location verification or determination feature, which is operable to permit or disallow gaming from the remote location depending upon whether or not the location meets one or more criteria. The criterion may be, for example, whether the location is within a pre-defined area in which gaming is permitted by law.

Figure 1:
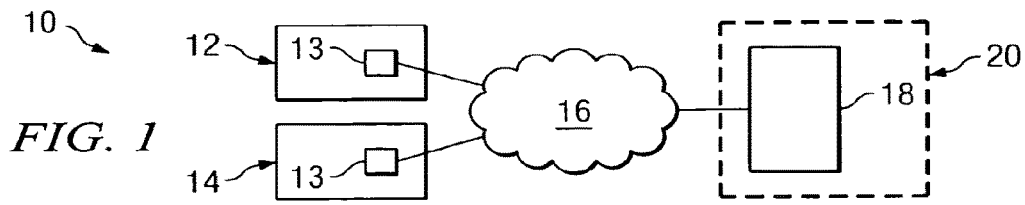
FIG. 1 illustrates a gaming system according to an embodiment of the present invention.

As shown in FIG. 1, for example, gaming system 10 includes at least one user 12. The system may include additional users such that there is at least a first user 12 and a second user 14. Multiple users may access a first gaming system 10, while other multiple users access a second gaming system (not shown) in communication with first gaming system 10. Users 12 and 14 preferably access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

Preferably, software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user. Software resident on•the computer is preferably able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are within the scope of the present invention. Further, it will be understood that additional components may be used in the communication of information between the users and the gaming server. Such additional components may. include, without limitation, lines, trunks, antennas, switches, cables, transmitters, receivers, computers, routers, servers, fiber optical transmission equipment, repeaters, amplifiers, etc.

In at least one embodiment, the communication of gaming information takes place without involvement of the Internet. However, in certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Figure 2:
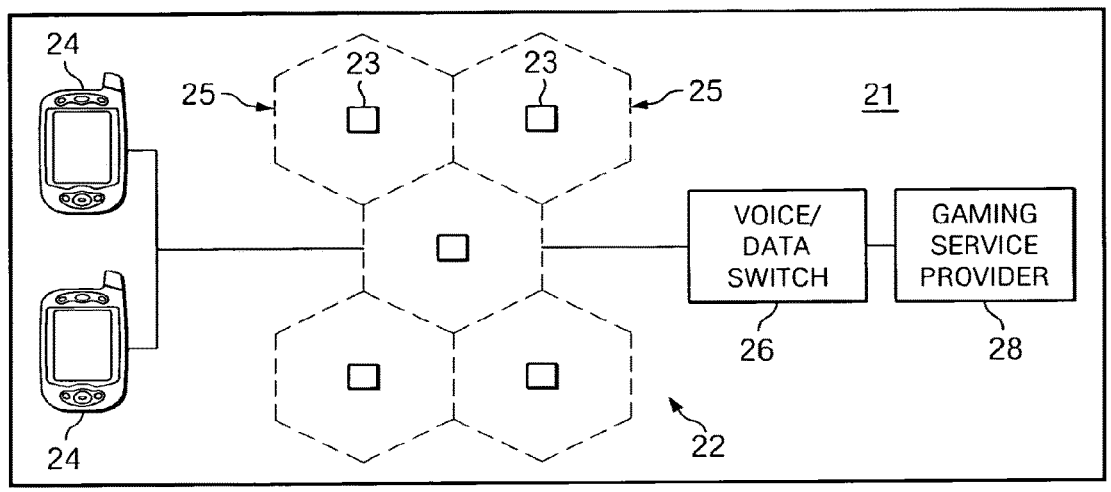
FIG. 2 illustrates a wireless gaming system according to an embodiment of the present invention.

According to one embodiment, as shown in FIG. 2 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which is preferably connected to the wireless portion of the network via a dedicated, secure landline. The communications network also includes a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

Preferably, in the case of a cellular network for example, the gaming system is enabled through the use of a private label carrier network. Each base station is programmed by the cellular carrier to send and receive private secure voice and/or data transmissions to and from mobile station handsets. The handsets are preferably pre-programmed with both gaming software and the carrier's authentication software. The base stations communicate via private T1 lines to a switch. A gaming service provider leases a private T1 or T3 line, which routes the calls back to gaming servers controlled by the gaming service provider. Encryption can be installed on the telephones if required by a gaming regulation authority, such as a gaming commission.

The cellular network is preferably a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required.

Further, the devices are preferably not allowed to "connect" to the Internet. This ensures a high level of certainty that bets/wagers originate and terminate within the boundaries of the gaming jurisdiction and the "private" wireless system cannot be circumvented or bypassed. Although in certain embodiments some data and/or voice traffic may be communicated at least partially over the Internet, it is preferred that the communication path does not include the Internet. Alternatively, in some embodiments, certain non-gaming information may be transported over a path which includes the Internet, while other information relating to the gaming activities of the system is transported on a path that does not include the Internet.

Figure 3:
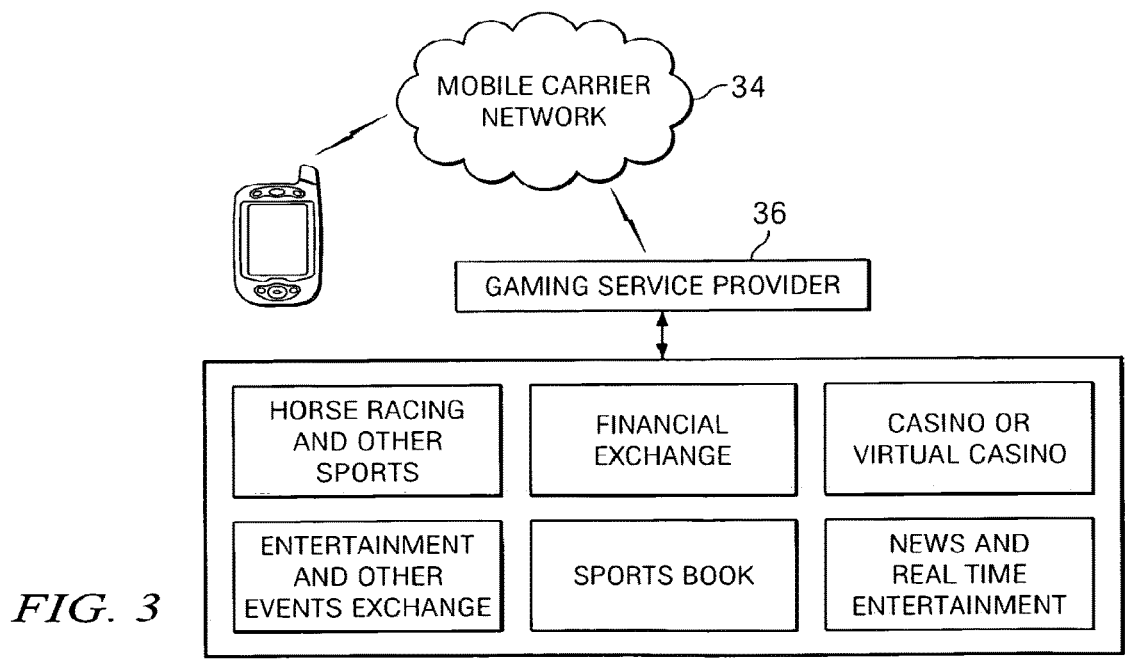
FIG. 3 is a block diagram of a gaming system illustrating various gaming activities in accordance with an embodiment of the present invention.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential activities.

Figure 4:
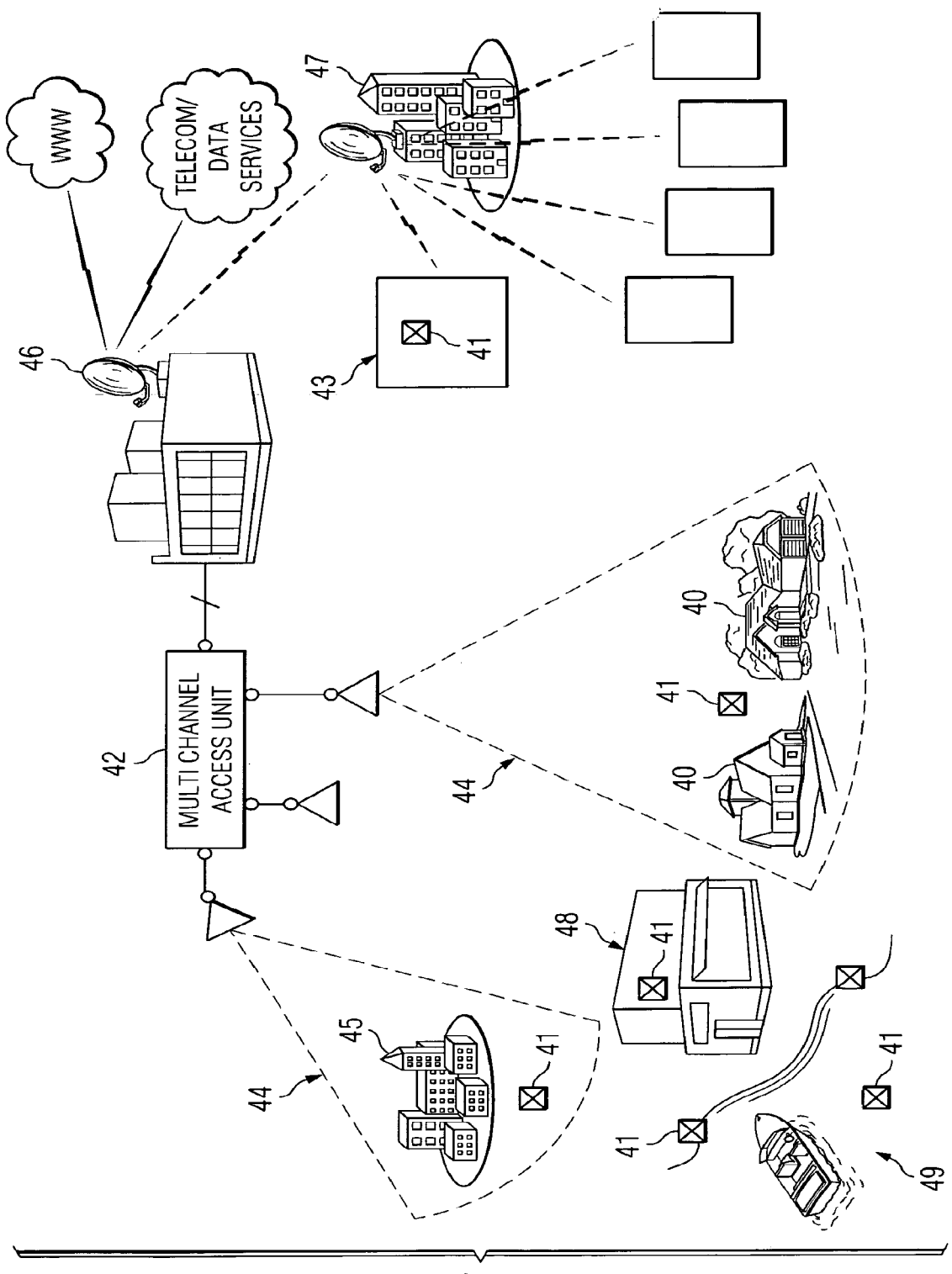
FIG. 4 illustrates a wireless gaming system showing coverage areas in accordance with an embodiment of the present invention.

In another embodiment, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because the preferable technology covers smaller areas and provides very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified within the scope of the present invention.

In one embodiment, the system architecture for the gaming system includes:
  (1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and
    (a) CDMA-technology that is secure for over-the-air data protection;

(b) at least two layers of user authentication, (that provided by the mobile carrier and that provided by the gaming service provider);
(c) compulsory tunneling (static routing) to gaming servers;
(d) end-to-end encryption at the application layer; and
(e) state-of-the-art firewall and DMZ technologies;
(2) an MWAN (Metropolitan Wireless Access Network), which consists of 10 licensed and license-exempt, point-to-point links, as well as licensed and license exempt, point-to-multi-point technologies;
(3) private MAN (Metropolitan Access Network) T1 and T3 lines to provide connectivity where wireless services cannot reach; and
(4) redundant private-line communications from the mobile switch back to the gaming server.

Each of the "Game Spots" or "Entertainment Spots" is preferably connected via the MWANlMAN back to central and redundant game servers. For accessing the private wireless networks 41, the gaming communication devices are preferably WiFi- or WiMax-enabled PDAs or mini-laptops, and do not have to be managed by a third-party partner.

Preferably, the gaming system includes a location verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may included such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In one embodiment, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
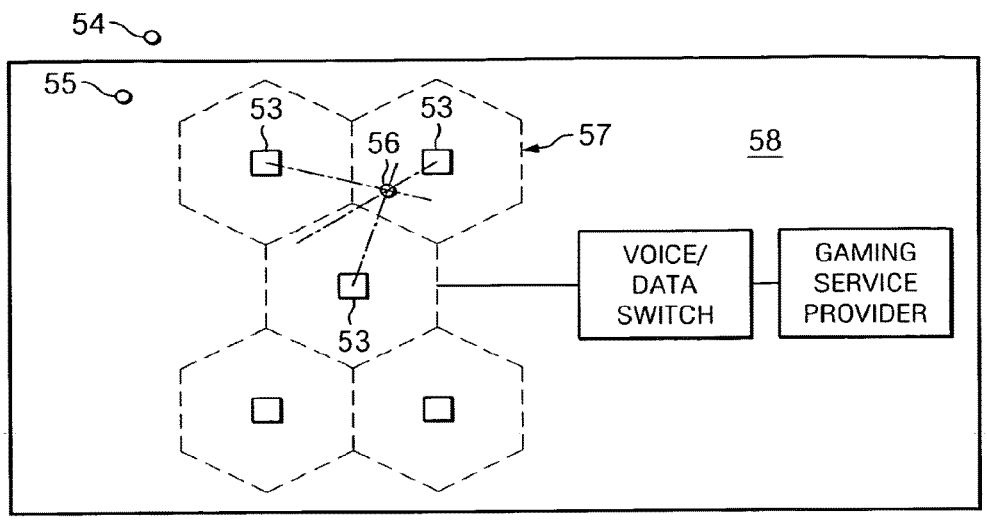
FIG. 5 illustrates a wireless gaming system showing triangulation location determination in accordance with an embodiment of the present invention.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing does not specify location. Rather, it ensures that a mobile station is within certain boundaries. For instance, geo-fencing may be used to ensure that a mobile station beyond state lines does not access the gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In another embodiment, location verification is accomplished using channel address checking or location verification using some other identifying number or piece of information indicative of which network or portion of a network is being accessed by the gaming communication device. Assuming the using of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. Preferably the gaming service provider either maintains, or has access to, a database that maps the various possible worldwide mobile network identifying numbers to geographic areas. The invention contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In another embodiment, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example). An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

Figure 6:
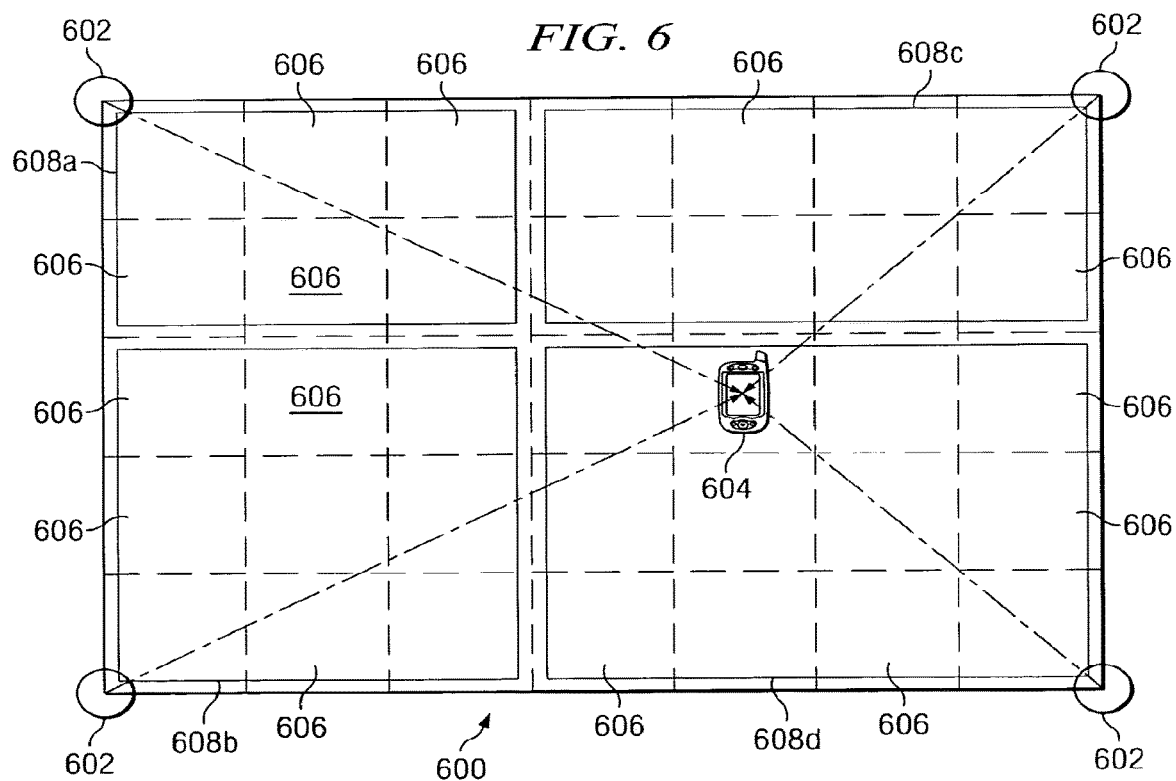
FIG. 6 illustrates a wireless gaming system having location determination in accordance with an embodiment of present invention.

In particular embodiments, the gaming system of the present invention may also include the ability to determine the location of the gaming communication device within a larger property, such as a casino complex. This may allow certain functionalities of the device to be enabled or disabled based upon the location of the device within the property. For example, government regulations may prohibit using the device to gamble from the guest rooms of a casino complex. Therefore, particular embodiments of the present invention may include the ability to determine the location of the device within the property and then disable the gambling functionality of the device from a guest room, or other area where gambling is prohibited. FIG. 6 illustrates an example of a wireless gaming system in which the location of a gaming communication device 604 may be determined in accordance with a particular embodiment of the present invention.

As shown in FIG. 6, a wireless gaming system comprises a wireless network that at least partially covers casino complex 600 in which one or more gaming communication devices 604 may be used to participate in a variety of gaming activities. Preferably, the wireless network comprises at least three signal detection devices 602, although particular embodiments of the present invention may include fewer or greater than three signal detection devices and still fall within the teachings of the present invention. As shown in FIG. 6, the wireless network comprises four signal detection devices 602, each located at one corner of casino complex 600. In particular embodiments of the present invention, these signal detection devices may comprise wireless access points, wireless routers, wireless base stations, satellites, or any other suitable signal detection device. Furthermore, although signal detection devices 602 are illustrated as being located on the boundaries of casino complex 600, signal detection devices may be located anywhere inside or outside of casino complex 600, provided the signal detection devices are operable to receive signals originating from a gaming communication device 604 inside casino complex 600. In particular embodiments of the present invention, signal detection devices 602 may also be used to transmit, as well as receive, signals to gaming communication device 604.

In particular embodiments, casino complex 600 may be divided into one or more zones 608, which represent different areas of the casino complex, such as the lobby, guest rooms, restaurants, shops, entertainment venues, and pool areas. For example, as shown in FIG. 6, zone 608a may correspond to the casino lobby, zone 608b may correspond to guest rooms, zone 608c may correspond to restaurants, and zone 608d may correspond to the gaming floor of the casino. Each zone 608 may be further divided into one or more sub-zones 606, each specifying a particular location within zone 608. Typically, sub-zones 606 are arranged in a grid formation, each sub-zone 606 having a uniform size. In some embodiments, each sub-zone may comprise 9 square feet (i.e., 3 feet by 3 feet). In other embodiments, each sub-zone may comprise 100 square feet (i.e., 10 feet by 10 feet). Generally, the choice of the size of an area covered by a sub-zone may depend on administrator preferences, technical limitations of the wireless network, and governmental regulations, as well as other considerations.

Particular embodiments of the present invention may use this mapping of casino complex 600 into a plurality of zones 608 and sub-zones 606 to determine the location of gaming communication device 604 within the complex. Generally, these embodiments utilize the signal received by signal detection devices 602 from gaming communication device 604 to determine the location of the device In particular embodiments, the location of gaming communication device 604 may be determined based upon the strength of the signal received by each signal detection device 602 from device 604. In particular embodiments, this may be accomplished using a Received Signal Strength Indication (RSSI) value or any other suitable indication of signal strength. Generally, the closer a sub-zone is to a signal detection device, the stronger the signal the signal detection device will receive from a gaming communication device located in that sub-zone. Therefore, given a plurality of signal strength readings taken from different points in the casino complex (i.e., signal detection devices 602), these different signal strength readings may be used to determine the location of the device.

With this in mind, each sub-zone 606 of casino complex 600 may be associated with a reference set of signal strengths received by the signal detection devices from a device located in that particular sub-zone. Typically, these values are generated, and periodically recalibrated, by taking a reference reading from a gaming communication device located that sub-zone. After each sub-zone is associated with a reference set of signal strengths, these reference signal strengths may be compared with the signal strengths received by the signal detection devices from a gaming communication device. Since each sub-zone has a unique set of signal strengths, this comparison may be used to identify the particular zone in which the gaming communication device is located.

In another embodiment of the present invention, the location of gaming communication device 604 may be determined based upon an elapsed time between the transmission of the signal from device 604 and the receipt of the signal by each signal detection device 602. In particular embodiments, this elapsed time may be determined based on a Time Difference of Arrival (TDOA), or any other suitable technology. As before in the case of signal strengths, each sub-zone 606 may be associated with a predetermined, or reference, set of elapsed times from transmission to receipt of a signal from a gaming communication device. This set of elapsed times will be different for each sub-zone of the casino complex, as the time it takes a signal to reach each signal detection device will depend on the proximity of the sub-zone to each base station. By comparing the time from transmission to receipt of a signal received by the signal detection devices from a gaming communication device, the sub-zone in which the device is located may be determined.

Once the location of the gaming communication device has been determined, particular embodiments of the present invention may then enable and/or disable particular functions of the device based on this determination. For example, as mentioned previously, particular embodiments may disable the gaming communication device's gambling functionality from a user's guest room, while still allowing the user to use other device functions, such as purchasing merchandise or services, or buying tickets to an entertainment event. Once the user leaves his or her guest room, the gambling functionality of the gaming communication device may be enabled. Similarly, particular embodiments of the present invention may prevent the gaming communication device from being used to make financial transactions from the casino floor. Once the user leaves the casino floor, such functionality may be enabled. Similarly, other functionalities of the gaming communication device may be enabled or disabled based upon the location of the device within the property in accordance with various embodiments of the present invention.

In particular embodiments of the present invention, the various functionalities of the gaming communication device may be enabled or disabled based upon the zone 608 in which the device is located. In such an embodiment, each zone 608 of the casino complex may be associated with a set of allowed activities. For example, the "lobby" zone 608a of the casino complex may have all activities allowed, while the "guest room" zone 608b of the property may have all activities allowed except gambling. Based upon the gaming communication device's location, the functionality of the gaming communication device may be limited to the set of allowed activities for the zone in which the device is located. As the gaming communication device travels from zone to zone, the location of the device may be re-determined, and the functionality of the device may be updated to reflect the set of allowed activities for the zone in which the device is now located.

Particular embodiments of the present invention may also use the location determination to send location-specific information to the gaming communication device. For example, a reminder that an entertainment event the user has tickets to is about to begin may be sent to the user's device if the device (and therefore the user) is located in a different part of the casino complex. In another embodiment, a user may be alerted that the user's favorite dealer is on the casino floor if the user is located in his or her guest room.

In some embodiments the location of the gaming communication device may be used to deliver goods and services purchased or ordered by the user of the device. For example, in particular embodiments of the present invention, the user may purchase food and beverages using the device. The location of the device may then be used to deliver the food and beverages to the user, even if the user relocates to another sub-zone after placing his or her order.

The determination of the gaming communication device's location may also be used to provide the user with directions to another part of the casino complex. For example, a user that is located on the casino floor that wishes to go to a specific restaurant within the complex may be given direction based upon his or her location.

These directions may then be updated as the user progresses towards his or her desired location. In the event the user gets off-course, the location determination, which may be updated during the user's travel, may be used to alert the user they have gotten off-course and then plot a new course to the desired destination.

An example method of using a wireless gaming system to determine the location of a gaming communication device within a casino complex and then enable or disable functionality based on the location of the device is shown in FIG. 7. FIG. 7 illustrates flowchart 700, which describes a method of location verification in accordance with a particular embodiment of the present invention. Flowchart 700 commences in step 702. After flowchart 700 begins, the wireless network is calibrated in step 704. Generally, this entails establishing a set of reference values used to identify each sub-zone of the casino complex or other property. In particular embodiments of the present invention, these values may include the signal strengths received by each signal detection device from a gaming communication device located in that sub-zone. In other embodiments, these values may include the elapsed time from transmission to receipt of a signal by the signal detection devices from a gaming communication device located in the sub-zone. Moreover, in additional embodiments of the present invention, these reference values include a combination of signal strengths and elapsed times from transmission to receipt of a signal.

Once the wireless network is calibrated, with a set of reference values associated with each sub-zone of the property, one or more gaming communication devices may use the wireless network to transmit and receive information to and from one or more gaming servers. At step 706, the plurality of signal detection devices that comprise the wireless network receive a signal from a gaming communication device. The location of this gaming communication device is determined at step 708. In particular embodiments of the present invention, this is accomplished by determining the strength of the signal received by each signal detection device and comparing this set of signal strengths to a reference set of signal strengths determined during calibration. In other embodiments, the location of the gaming communication device may be determined by determining the time that has elapsed between the transmission of the signal from the gaming communication device and its receipt by each signal detection device. This set of elapsed times may then be compared to a reference set of elapsed times between transmission and receipt of a signal for each zone that was determined during calibration. Based upon the comparison of the reference values determined during calibration, and the signal received by each signal detection device, the sub-zone, and therefore zone, in which the gaming communication device is located may be determined.

At step 710, different functionalities of the gaming communication device may be enabled or disabled based upon the zone in which the device is located. In particular embodiments, each zone is associated with a set of allowed activities. For example, a zone that comprises the lobby of the casino complex may have all activities allowed, while a zone that comprises guest rooms may have all activities except gambling allowed. If a gaming communication device is determined to be located in a particular zone, these embodiments may then enable or disable the functionality of the device to match the set of allowed activities for that particular zone. Other functionalities may be enabled or disabled as described above in regard to FIG. 6.

Since gaming communication devices may be mobile in accordance with particular embodiments of the present invention, particular embodiments of the present invention periodically re-determine the position of the device. This allows the user to use the gaming communication device while carrying the device throughout the property and have its functionality updated accordingly. Therefore, at step 712, a determination is made whether to repeat the location determination. This may be performed automatically at set intervals or upon the occurrence of some event, such as a request from the user or the receipt of an additional signal from the device. If the location is to be re-determined, flowchart 700 returns to step 706, where another signal is received from the communication device, and its location and functionality is updated accordingly. If, however, the location, the flowchart 700 simply terminates at step 714.

By determining the location of the gaming communication device within the property, particular embodiments allow the functionality of the device to be tailored to the device's location. Furthermore, location-specific or directional information may be transmitted to the gaming communication device based upon the location of the device. This allows for a more customizable user experience, as well as allowing gaming administrators to tailor the functionality of the device based upon the device's location and any applicable governmental regulations.

FIG. 8 illustrates a method of operation of a gaming communication device in accordance with a particular embodiment of the present invention. As previously, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein.

In the example method shown in FIG. 8, in a first step 802, the gaming communication device is activated. This may take place as a function of turning on a phone, PDA, or other communication device as described elsewhere herein. Preferably, activation comprises connecting the gaming communication device to a private data network. Part of the activation includes logging in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 804, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby.

In a next step 806, the user selects an activity, such as a particular casino table game. In step 808, the user is presented with one or more options related to the selected activity. In step 810, the user selects an option. For instance, at this point, the user might place a wager, draw a card, select a restaurant or restaurant menu item, select a news source or a news story, place a buy or sell order on a financial exchange, place a bet on a certain box office performance over/under amount for a given movie, etc. The options for user input are myriad. In step 812, the software resident on the gaming communication device accepts the option input by the user and transmits the input data to the software resident at the gaming server. In step 814, the gaming server software acts on the input data.

Actions at this point, may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and in step 816. In step 818, the user acknowledges the response. For example, in the case of gambling, the user might acknowledge that he won a hand of blackjack because the dealer busted and that his payout was $100 based on a $50 bet at even odds. In step 820, the user logs out.

In the situation where the user is gambling, after the series of steps described in connection with FIG. 8, (or a subset or modified series of steps), the user physically enters a casino and goes to a casino cashier for payout and/or settlement (which can include, for example, extensions of credit or advance deposits). In one embodiment, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

The duration of activation of the gaming communication device, the duration of a particular session, and/or the duration of a particular activity may be controlled according to any number of different parameters. For example, the duration may be based on a predetermined amount of time or period of time. Activation of the gaming communication device may terminate upon the expiration of a predetermined time period. As another example, an activity may only be permitted until the occurrence of a particular time of day. According to an alternative, an administrator, or another party to a transaction within any of the various activities, may determine the time period. or amount of time. According to yet another alternative, the duration may end upon the occurrence of an event such as the user entering or leaving a particular location. The duration of activation may be dynamically determined based on a period of non-use. In other words, after a predetermined time without being used, the device may "time out" and be deactivated. The period of time, or amount of time, may be cumulatively determined. For example, an activity may only be permitted for a period of five hours, collectively. Time counting toward the five hours might stop and start depending upon the location of the user. As another example, an activity might only be permitted so long as the user does not enter or leave a particular location for longer than a predetermined period of time.

Similarly, activation of the gaming communication device and/or the ability for a user to engage in a particular activity may only be permitted during a specified time of day, or for a particular period of time prior to an event, or for a particular period of time after notification to the user. Also, activation and/or access may be controlled based upon the location of the user. For example, if a user is in a particular casino in which a particular show will take place that evening, the user might be notified that tickets to the show are available for a specified period of time prior to the show. The user might only be permitted to engage in the activity of purchasing tickets for the show if the user is in the casino and during the specified period of time prior to the show. For example, the user might only be able to purchase tickets while in the casino and up to five minutes before the start time of the show. Similarly, the activation of the device may be restricted based on the location of the user and a corresponding period of time. For example, if a user is in a location where a show is occurring, or is going to occur, the device may be deactivated (either automatically, or by a party other than the user) during a period beginning five minutes prior to the show and ending five minutes after the end of the show.

According to another alternative, the duration or enablement of one activity might be determined by the participation of the user in another activity. For example, a user might be allowed to make dinner reservations at a popular restaurant if the user has been gambling enough at a given casino. In this way, bonuses or comps may be determined or managed based on the activity of the user via the gaming communication device.

Figure 9:
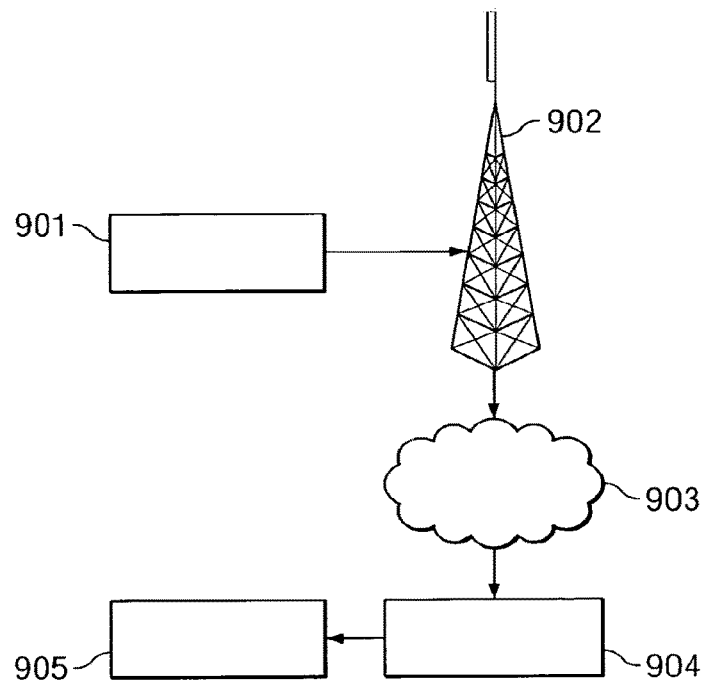
FIG. 9 depicts a wireless gaming system showing a communication path in accordance with an embodiment of the present invention.

Preferably, data is transmitted back and forth during the gaming activities between the gaming communication device and a server controlled by the gaming service provider. An example of the path of communication is shown in FIG. 9. Gaming data, such as a wager placed by the user, is transmitted from gaming communication device 901 to a base station 902 (or a transmitter in the case of a private wireless network such as a WiFi or WiMax network). Base station 902 routes the data through network 903 to a hub or gateway 904, which in turn routes the data to a gaming server 905 operated by a gaming service provider. Preferably, the communication from gaming communication device 901 to the network 903 comprises wireless communication. This may be any type of known wireless communication or any type of wireless communication available in the future. Examples of acceptable wireless communication protocols include CDMA, GSM, and GPRS.

Preferably, the communication from the network 903 to the gateway 904 and to the server 905 is conducted over secure land lines. FIG. 9 is an example communication network only and the present invention should be understood to cover other networks in which data may be transmitted from gaming communication device 901 to server 905. Preferably, data in response to data being transmitted from gaming communication device 901 to server 905 is transmitted back to gaming communication device 901 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino.

With respect to payment and/or receipt of winnings and losses, one possible approach is as follows. Upon check-in at a casino hotel, a hotel representative may query a guest as to whether the guest wants access to a gaming communication device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a gaming session. This may occur, for example, if a user selected a casino cashier activity from the gaming environment and instructed the cashier to add funds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the gaming activities. For example, a user might remotely (via the gaming communication device) place an order at a restaurant. Then, the user might make advance payment for the meal at an ATM-type machine which is operable to receive instructions corresponding to the financial transaction requirements of the activity of ordering food.

A unique aspect of the present invention includes establishing an electronic record of the gaming transactions undertaken by a user. Preferably, this is accomplished by utilization of a keystroke log, which is an electronic record of all keystrokes made by the user. Utilization of a keystroke log in this context allows for unprecedented monitoring of a user's gaming activity. In the event of a dispute, one may refer to the keystroke log and readily determine whether, in fact, a user placed a particular wager, for example.

An additional possible aspect of the electronic record is to allow a gaming control board or other regulatory authority, access to the electronic record in a direct manner in order to conduct periodic independent monitoring of the gaming activities conducted over the system. Another possible aspect is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 10:
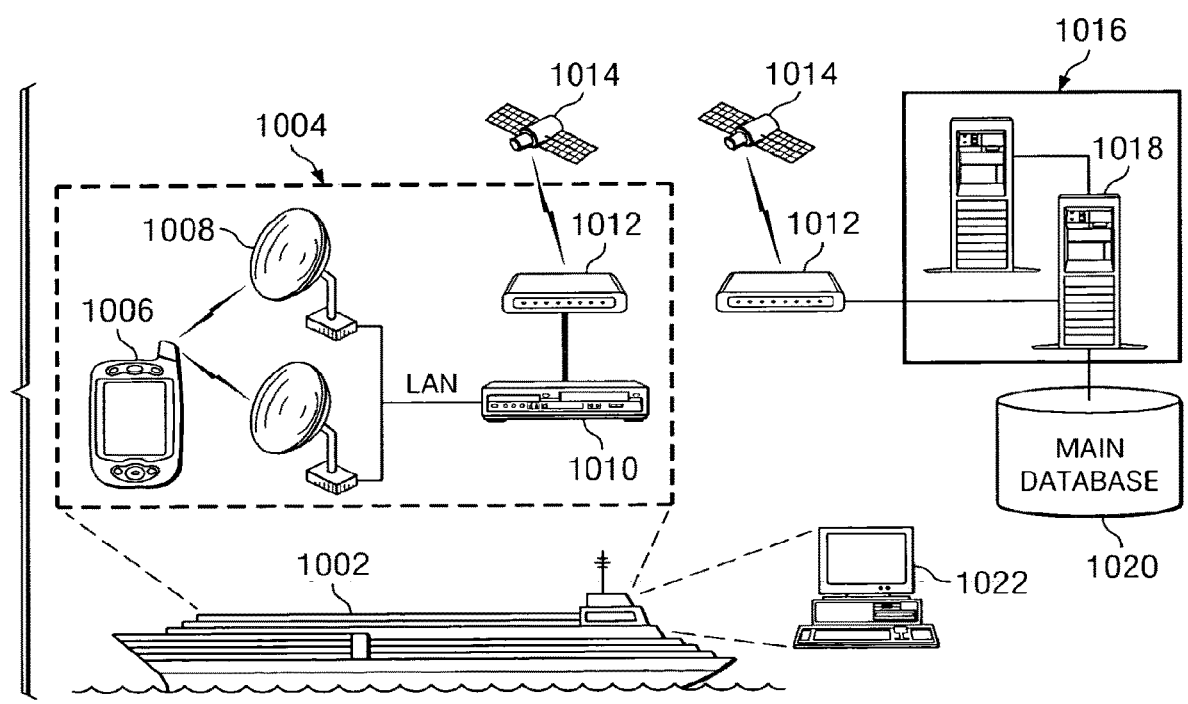
FIG. 10 illustrates a ship-based gaming system in accordance with an embodiment of the present invention.

In another embodiment of the invention, as shown in FIG. 10, a ship-based gaming system is provided. The system preferably comprises passenger vessel 1002, such as a cruise liner for example. The system includes one or more gaming communication devices 1006 connected to a communication network. The network shown in FIG. 10 comprises a mobile network with base stations 1008 connected via a LAN to a base station controller (SSC) 1010. BSC 1010 is connected via a T1 interface to a first Very Small Aperture Terminal (VSAT) modem 1012, which is in communication with a first satellite 1014. First satellite 1014 is operable to transmit and receive signals from second satellite 1014, which is in communication with second VSAT modem 1012. Second VSAT modem 1012 is in communication with a gaming server 1018 located at gaming service provider 1016. Gaming server is coupled to gaming database 1020. Again, the network configuration depicted in FIG. 10 is for example purposes only, and other configurations are within the scope of the present invention. An on-board back office 1022 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions conducted over the gaming system. In one example scenario the user is in a fixed, but remote, location from the gaming server, which may be located on the premises of a casino. This may be include, for instance, a situation in which the gaming communication device is a kiosk or some other communication device which is in a fixed position or which is tethered to a fixed position so that the gaming communication device cannot be moved beyond a certain area. In another example scenario, the user starts a gaming transaction at a first location and ends the transaction at a second location different from the first location. In another example scenario, the user is mobile during a single gaming transaction. In another example scenario, the user is mobile within a first approved area then (during the gaming transaction) the user moves outside the first approved area, through an unapproved area, to a remote second approved area.

In an alternative embodiment, the gaming system may be configured to operate as a "curb-to-curb" gaming system. In such a system, a communication path may be established between the device and a particular server, based upon whether the user is in a location corresponding to that particular server. For example, the user might enter a first casino, or an authorized area associated with the first casino, and thereby activate the establishment of a communication path between the device and a server located at and/or controlled by the first casino. While the user is on the premises of the first casino, the user might be able to participate in activities, such as playing blackjack, at the first casino. Then, if the user leaves the first casino, the gaming system might be configured to terminate the first communication path (i.e., between the device and the first casino's server), or otherwise deactivate the device and/or terminate the user's ability to use the device to participate in activities associated with the first casino. When the user enters a second casino, or an authorized area associated with the second casino, a second communication path (e.g., between the device and a second server located at or controlled by the second casino) may be established. Thus, the user would now be able to play blackjack (or engage in other activities) at the second casino, rather than the first casino.

As another example, a particular casino is often related to other casinos within a jurisdiction or specified area. Under such a scenario, if a user entered any of the related casinos, then the appropriate communication path or paths could be established between the gaming communication device and one or more of the casinos in the group of related casinos, thereby enabling the user to play casino games (or engage in other activities) at the one or more casinos in the group of related casinos. Depending on regulatory requirements, the preferred configuration might be to establish a communication path with a server at a particular casino within the group at which the user wants to play. Then, a different communication path could be established at a subsequent casino if the user wants to play at another casino. Under certain circumstances, and again depending on regulatory requirements, some information associated with user activity might be maintained at a centralized server accessible by more than one casino within the group.

In another example embodiment, the gaming system may be used to enable gaming activities involving multiple wireless users who interact with one another. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the gaming system is the provision of a poker game in which users place bets against one another instead of, or in addition to, placing bets against the house. Another example of interaction between users is when a first user makes restaurant reservations or purchases event tickets, thereby reducing the options available to the second user.

Preferably, the gaming service provider provides at least the following functions. First the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as transaction monitoring and key stroke logging services. The gaming service provider may also provide data management and security services. These services are not intended to be exhaustive and the gaming service provider may provide other services which facilitate the gaming process.

It should be noted that the invention can be implemented in connection with any gaming environment or an environment for any other activity, which may be conducted electronically. The invention is not limited to Nevada or any other particular gaming jurisdiction. For instance, the invention can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the invention might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the invention to participate in remote gaming, while enjoying some other primary activity in a location remote from the gaming facility. Further, the invention is not limited to gaming, but can include other applications, such as trading financial instruments, and wagering on other types of events, such as elections, award events, or any other activity.

Another example embodiment involves the application of one or more of the methods and systems described herein to the activity of conducting financial transactions. Thus, the gaming communication device may be configured to enable a user to conduct such financial transactions, which may include, without limitation, any transaction involving a financial institution, such as banking, trading securities, or managing 401K or other investment fund assets. Preferably, a communication path would be established between the user and any of the servers or other computers necessary to conduct the financial transaction. As with certain other embodiments the ability to engage in this activity may be controlled by one or more parameters including location and/or identity verification and time or duration limits.

Conducting financial transactions may be one of the activities presented to the user of the gaming communication device. Any of the possible financial transactions might be presented as sub-activities. As an example, a user might want to trade securities listed on a particular exchange. Regulations might require the trader to be located within a certain jurisdiction to execute trades on the exchange. The exchange might have its own rules and could require that the trader be located on the premises. With the location verification techniques described elsewhere herein, the particular financial transaction activity might only be enabled if the user is located in a particular geographic area, for example.

As a related feature, the system may be configured to provide a credit verification feature, according to which a user's creditworthiness may be checked by a party to a transaction, or by which the user might apply for credit. For example, if a user wants to purchase $10,000 worth of a particular stock, then a communication path might be established between the user and a server located at and/or controlled by an exchange upon which the stock is being traded. An additional communication path might be established between the exchange server and a server of an account manager that manages the user's account. These communication paths would enable the basic transaction—that of the user purchasing the stock. Yet another communication path, however, might be established between a seller's server, the exchange server, and/or the account manager server and a server located at and/or controlled by a credit agency. This path would enable an interested party to the transaction to check and/or approve the user's credit to prior enabling the transaction.

According to one aspect of certain embodiments, a user of the gaming communication device can connect from the device to a financial service provider's server to provide a "Push to Trade" feature. In order to enable this feature, the device is configured to be capable of facilitating a "Push to Talk" protocol, whereby the device behaves like a walkie-talkie. Thus, the device may include any suitable program or application that enables the Push to Talk feature. As used herein, the phrase "Push to Talk" includes any protocol that allows for a direct connection feature for an end user. Included are all such protocols (e.g. Instant Talk, Fastchat, etc.) within the broad rubric of "Push to Talk" including those that provide wide-area, instantaneous contact.

The Push to Talk protocol allows a given device to instantly connect to any number of other devices, such as any other telephone (mobile or landline-based), personal computer, laptop, etc. The connection for the end user does not have to be spawned by any conventional dialing or by triggering some form of automatic dialing. A simple button can be depressed to provide the requisite connection. In the context of timing, Nextel (who developed the original Push to Talk technology) suggests that their Push to Talk protocol should connect within 2 seconds.

A related technology is Push to Talk Over Cellular (PoC). PoC service is a form of interactive voice messaging that combines walkie-talkie and cellular phone connectivity, allowing users to quickly connect with another person or an entire group of friends and contacts at the push of a button on a PoC-enabled handset.

The Push to Talk protocol allows users to use the walkie-talkie paradigm over an IP or a cellular network, which diminishes the boundary limitations of a conventional two-way radio. The Push to Talk service is based on a disruptive technology. Latency is an issue during some traditional mobile telephone conversations. One appeal of the Push to Talk platform, as compared to executing a traditional telephone call, is being able to talk to an individual or to a group of individuals instantly, without waiting for someone to answer due to latency issues. Another benefit of the Push to Talk feature is a shorter than normal phone call, which cuts down on dialing costs for corresponding end users. Nextel estimates that the average Push to Talk call lasts forty seconds. Push to Talk technology is compatible with virtually any network communications; for example, the Push to Talk protocol may readily be used in conjunction with cellular telephone networks, including GSM and CDMA. The network equipment used for the Push to Talk feature is currently being offered by companies such as Ericsson, Motorola, Siemens, Sony Ericsson, and Nextel.

Because Push to Talk effectively turns the handheld device into a walkie-talkie, it not only successfully enables end users to send voice messages, it also enables immediate data texts (commonly referred to as "direct messaging"). Push to Talk messaging represents a significant improvement over short messaging systems in bypassing the slow and clumsy process of entering text via a phone keypad. This makes text messaging quicker and more effective.

According to the "Push to Trade" feature, once the end user initiates the call, the financial service provider is instantly connected to the end user. In one embodiment, the financial service provider has one or more electronic trade desks that are dedicated to this feature for their clients. Thus, all "Push to Trade" requests may be received at this location. In other embodiments, any suitable entity, broker, standard trading desk, or electronic device may receive such Push to Trade communications.

Once the connection has been established, the financial service provider may then simply conduct the trade as prescribed by the end user. For example, upon connection, the end user may be presented with the financial or market environment in which he seeks to participate. The trade desk representative or device can query the end user to execute an electronic or a broker-assisted trade. In addition, the financial environment may be presented in various stages. For instance, in a first stage, the financial environment may comprise a financial summary of all markets where the user is presented with certain financial options including, for example, specific market summaries, specific prices for selected assets (e.g. commodities, stocks, bonds, etc.), current positions, buying power, etc. In a subsequent stage, the user may be presented with optional instances of the type of activity selected from the market platform.

From this platform, the end user can select an activity, such as a particular type of trade. Thus, the user is presented with one or more options related to the selected activity. For instance, at this point, the user might place a buy or a sell order on a financial exchange. The software, which may be resident on the device, on the server, or on a combination of both, accepts the option input by the user and transmits the input data to the financial service provider. Subsequently, the financial service provider acts on the input data. The Push to Talk technology readily accommodates a voice log of the transaction for audit or confirmation purposes. Hence, a digital voice storage may be provided, whereby the transaction (e.g., inclusive of bid and ask prices) is recorded. In addition, the automatic voice log can then relay this information back to the end user (e.g., via his e-mail or via a conventional postal mail service). This could occur as a matter of course such that the end user is routinely provided with a suitable confirmation receipt for all of his trading activity.

Actions at this point may include, without limitation, determining an outcome and/or amount for the trade, accessing another server and/or software application, retrieving additional information, preparing a suitable response to the user, etc. The action of determining an outcome and/or amount might take place, for example, if the user is using the device to place trades in conjunction with his account and a given exchange. Hence, this could include a formal tallying of the executed trade, inclusive of the charged commission, the amount debited from the account to cover the trade, etc. The action of accessing another server and/or software application might occur, for example, in the event the user is engaging in a services activity such as accessing news services. The action of retrieving information might occur when the financial software is prompted to access another server for the purpose of retrieving a certain type of information requested by the user. The financial service provider can then prepare a response to the user's input data. Once this activity has concluded, the user can acknowledge the response and then log out and terminate his session.

It should be noted that the "Push to Trade" feature can be used in other applications of the gaming technology described herein. For example, in an application where the user of the gaming communication device is playing blackjack from an authorized area outside the casino gaming area, the Push to Trade feature would enable the user to participate audibly in the blackjack game actually taking place within the casino gaming area. The Push to Talk technology would allow the user to immediately and virtually "sit down" at an actual blackjack table without the delay caused by the conventional setup and tear down process of certain traditional telecommunication protocols. Also, once the user is participating in the game, the user can communicate orally with the dealer, or other players that are physically at the table, without the latency issues of certain mobile telecommunication systems.

In at least one embodiment, the invention provides jurisdictional controls, which limit gaming to approved geographical areas. The invention may also include an age/identity verification feature. This can be accomplished through any applicable technique including retina scanning, finger print identification, voice print matching, or other biometrics. Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. Identity verification can also be accomplished by monitoring a keystroke characteristic (e.g., rhythm, patterns, or cadence) of the user, or any other method in which a parameter uniquely associated with the user can be observed. The invention may also provide for the logging of keystrokes. In at least one embodiment, all communications are accomplished without accessing the Internet.

Mobile, remote gaming may be desirable for many reasons, some of which have already been described. The invention may allow supplementation of existing in-house gaming revenue by allowing bettors to place bets while enjoying other leisure activities such as golf, swimming, dining and shows. The invention may complement the new coinless wagering environment as bettors can play their favorite games outside the casino. The invention provides a high-speed, reliable, accurate, and secure mobile gaming environment that complies with regulatory requirements for identification and location verification of the bettor with the ability to generate key stroke logs. The invention may restrict unauthorized usage from a geographic perspective and is capable of implementation using location verification technology (e.g., geo-fencing) to conform the gaming activities to legal parameters.

Consumers may benefit from an increased choice of gaming environments. Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the invention to increase their revenue base through a new, regulated, mobile, remote channel Customers wanting to be entertained during downtime or outside a casino will be able to play games on their gaming communication device and customers intimidated by a traditional casino environment will be able to play in private. The gaming jurisdictions may benefit from an increase in gaming an ancillary revenue growth because customers will have a more enjoyable experience.

The invention may also be used to deliver content at an increased speed compared to traditional telecommunications systems. The content may include, for example, live reports, entertainment, news, promotions and advertising.

As mentioned, the invention provides a mobile gaming environment that complies with regulatory requirements for identification and location verification of the bettor. Moreover, the system is designed to be one hundred percent "clean" from a regulatory perspective. The software is clean in that it has not been and will not be licensed to anyone who does business illegally or otherwise operates in a "gray" area. For example, in a preferred embodiment, the software is not licensed to an entity that will illegally operate the software, or otherwise illegally do business on, the Internet. This may be desirable in that certain gaming jurisdictions will not grant gaming permits or licenses to companies that do business with, or license technology to or from, other entities known to be engaging in illegal operations.

Preferably, the system is designed such that the gaming software (or other application software operating on the system) is also one hundred percent clean from a regulatory perspective. For instance, before granting a license, a gaming jurisdiction may require that the software being used is not tainted in that it has not been used by the license applicant in violation of any laws and has not been licensed or otherwise distributed or disseminated to others who have used the software for illegal purposes, or who have been engaging in illegal activity. Therefore, it is preferred that the gaming software be clean and untainted from this perspective.

The systems and methods described herein may also be used to deliver and/or access "Rich Media" content such as, for example, sports video (live or nearly live) and audio commentary. Such may often only be distributed within specific jurisdictions. Therefore, the distribution may benefit from the inventive aspects discussed herein, particularly the location verification aspect, such as geofencing.

The gaming system and methods described herein may permit, among other things, pari-mutuel wagering, sports betting, and dissemination of news and other content. The invention also enables a casino or other gaming provider to advertise ancillary services such as shows, bars, and restaurants. The invention also enables remote reservations and purchases in connection with such services.

According to an embodiment of the invention, the gaming system provides for the dissemination of real-time odds to users accessing the system.

In another embodiment, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A method comprising:
controlling, by at least one processor:
determining a first location of a mobile device by comparing predetermined sets of signal characteristics with a first set of signal characteristics measured between signal detection devices of a communications network and the mobile device,
in which the predetermined sets of signal characteristics respectively describe, for each of a plurality of locations covered by the communications network, signals between a calibration device at the location and the signal detection devices;
based on the first location, enabling at least one activity through the mobile device that is allowed at the first location if any is allowed at the first location;
calculating a cumulative amount of time that a user of the mobile device engages in the at least one activity from a plurality of locations; and
preventing the cumulative amount of time from exceeding a threshold amount of time.

2. The method of claim 1, in which the first set of signal characteristics includes strengths of a plurality of signals between the mobile device and the signal detection devices.

3. The method of claim 1, in which at least one of the signal detection devices includes at least one of a wireless access point, a wireless router, a wireless base station, or a satellite.

4. The method of claim 1, in which the first set of signal characteristics includes transmission times of a plurality of signals between the mobile device and the signal detection devices.

5. The method of claim 1, in which determining the first location includes determining that the first location is in a first region of a property that is covered by the communications network and includes multiple regions that are covered by the communications network.

6. The method of claim 5, further comprising:
controlling, by the at least one processor, suggesting a course adjustment to a user of the mobile device in response to determining that the mobile device has moved from the first region.

7. The method of claim 5, in which each of the regions is associated with at least one allowed activity; and in which enabling the at least one activity includes allowing the at least one activity associated with the first region.

8. The method of claim 5, in which the first region is divided into a plurality of areas, and in which the predetermined sets of signal characteristics include a first predetermined set of signal characteristics for each of the plurality of areas.

9. The method of claim 8, in which determining the first location includes determining an area of the plurality of areas in which the mobile device is located by comparing the first set of signal characteristics with the first predetermined sets of signal characteristics.

10. The method of claim 1, further comprising:
controlling, by the at least one processor, allowing, in response to determining the first location, at least one of a making of a reservation, a purchasing of merchandise, a purchasing of a service, a purchasing of food, a purchasing of a beverage, a purchasing of a ticket to an entertainment event, or a purchasing of transportation.

11. The method of claim 1, further comprising controlling, by the at least one processor, measuring each of the predetermined sets of signal characteristics before determining the first location.

12. The method of claim 1, in which the calibration device includes a second mobile device.

13. The method of claim 1, in which the calibration device is distinct from the mobile device.

14. The method of claim 1, further comprising controlling, by the at least one processor, calculating each of the predetermined sets of signal characteristics before the mobile device is allowed to use the communications network for the at least one activity.

15. The method of claim 1, in which determining the first location includes matching the first set of signal characteristics with a first predetermined set of signal characteristics of the predetermined sets of signal characteristics that corresponds to the first location.

16. The method of claim 1, in which each signal detection device includes a respective access point to the communications network through which the mobile device may access the communications network.

17. The method of claim 1, in which the at least one processor, the mobile device and the calibration device are distinct.

18. The method of claim 1, in which the plurality of locations is located within a property spanned by the communications network.

19. An apparatus comprising:
   at least one processor configured to control:
      determining a first location of a mobile device by comparing predetermined sets of signal characteristics with a first set of signal characteristics measured between signal detection devices of a communications network and the mobile device,
      in which the predetermined sets of signal characteristics respectively describe, for each of a plurality of locations covered by the communications network, signals between a calibration device at the location and the signal detection devices;
      based on the first location, enabling at least one activity through the mobile device that is allowed at the first location if any is allowed at the first location;
      calculating a cumulative amount of time that a user of the mobile device engages in the at least one activity from a plurality of locations; and
      preventing the cumulative amount of time from exceeding a threshold amount of time.

20. A non-transitory storage medium configured to store instructions which, when executed by a computer, control:
   determining a first location of a mobile device by comparing predetermined sets of signal characteristics with a first set of signal characteristics measured between signal detection devices of a communications network and the mobile device,
   in which the predetermined sets of signal characteristics respectively describe, for each of a plurality of locations covered by the communications network, signals between a calibration device at the location and the signal detection devices;
   based on the first location, enabling at least one activity through the mobile device that is allowed at the first location if any is allowed at the first location;
   calculating a cumulative amount of time that a user of the mobile device engages in the at least one activity from a plurality of locations; and
   preventing the cumulative amount of time from exceeding a threshold amount of time.

* * * * *